United States Patent
Sugita

(10) Patent No.: US 11,101,070 B2
(45) Date of Patent: Aug. 24, 2021

(54) PRINTING PLATE FOR GRAVURE PRINTING AND METHOD FOR MANUFACTURING MULTILAYER CERAMIC ELECTRONIC COMPONENT USING THE SAME

(71) Applicant: Murata Manufacturing Co., Ltd., Nagaokakyo (JP)

(72) Inventor: Hiroaki Sugita, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 152 days.

(21) Appl. No.: 16/590,448

(22) Filed: Oct. 2, 2019

(65) Prior Publication Data
US 2020/0118750 A1    Apr. 16, 2020

(30) Foreign Application Priority Data
Oct. 10, 2018    (JP) .............................. JP2018-191788

(51) Int. Cl.
| | |
|---|---|
| B41N 1/16 | (2006.01) |
| B41N 1/06 | (2006.01) |
| B41M 1/10 | (2006.01) |
| H01G 4/012 | (2006.01) |
| H01G 4/30 | (2006.01) |
| B41F 9/00 | (2006.01) |

(Continued)

(52) U.S. Cl.
CPC .............. *H01G 4/012* (2013.01); *B41F 9/00* (2013.01); *B41M 1/10* (2013.01); *B41N 1/06* (2013.01); *B41N 1/16* (2013.01); *H01G 4/30* (2013.01); *H01G 4/1227* (2013.01); *H01G 4/1236* (2013.01); *H01G 4/232* (2013.01); *H01G 4/248* (2013.01)

(58) Field of Classification Search
None
See application file for complete search history.

(56) References Cited

U.S. PATENT DOCUMENTS 9,358,825 B1 *    6/2016    Sawada ................. H01G 4/232

FOREIGN PATENT DOCUMENTS

| JP | 06-316174 A | 11/1994 |
|---|---|---|
| JP | 2006-095803 A | 4/2006 |

(Continued)

OTHER PUBLICATIONS

Official Communication issued in corresponding Korean Patent Application No. 10-2019-0124319, dated Oct. 28, 2020.

*Primary Examiner* — Joshua D Zimmerman
(74) *Attorney, Agent, or Firm* — Keating & Bennett, LLP

(57) ABSTRACT

A printing plate for gravure printing includes a gravure roll with a cylindrical shape, and printing portions corresponding to a graphic pattern to be printed is provided on an outer circumferential surface thereof. Each of the printing portions includes first banks extending in a substantially parallel direction to a rotation direction, second banks extending in a direction substantially orthogonal to the rotation direction and in each of which at least one end portion is connected to the first banks, and cells defined by the first banks and the second banks, and in the cell located at a print starting end portion of each of the printing portions which first comes into contact with a printing object in the rotation direction, a partition bank which divides the cell in a diagonal direction is provided.

14 Claims, 14 Drawing Sheets

(51) Int. Cl.
*H01G 4/248* (2006.01)
*H01G 4/12* (2006.01)
*H01G 4/232* (2006.01)

(56) References Cited

FOREIGN PATENT DOCUMENTS

KR   10-2017-0089432 A    8/2017
WO   WO-2005075214 A1 *   8/2005   .............. B41N 1/06

* cited by examiner

II-II CROSS-SECTIONAL VIEW

III-III CROSS-SECTIONAL VIEW

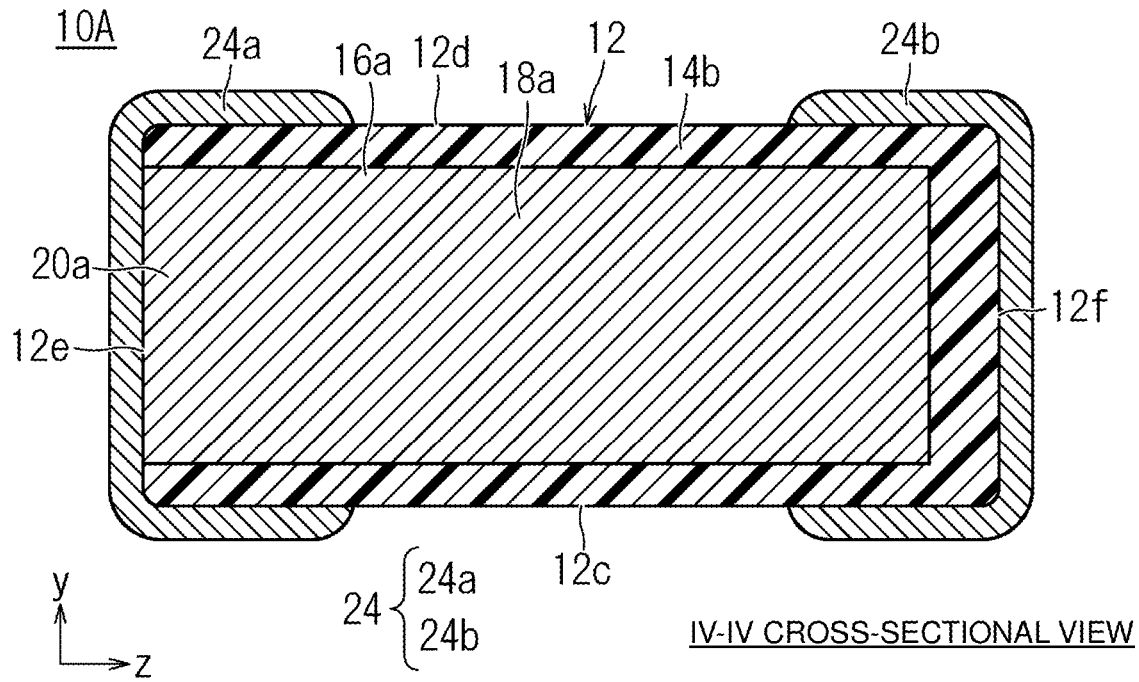
FIG. 4 IV-IV CROSS-SECTIONAL VIEW
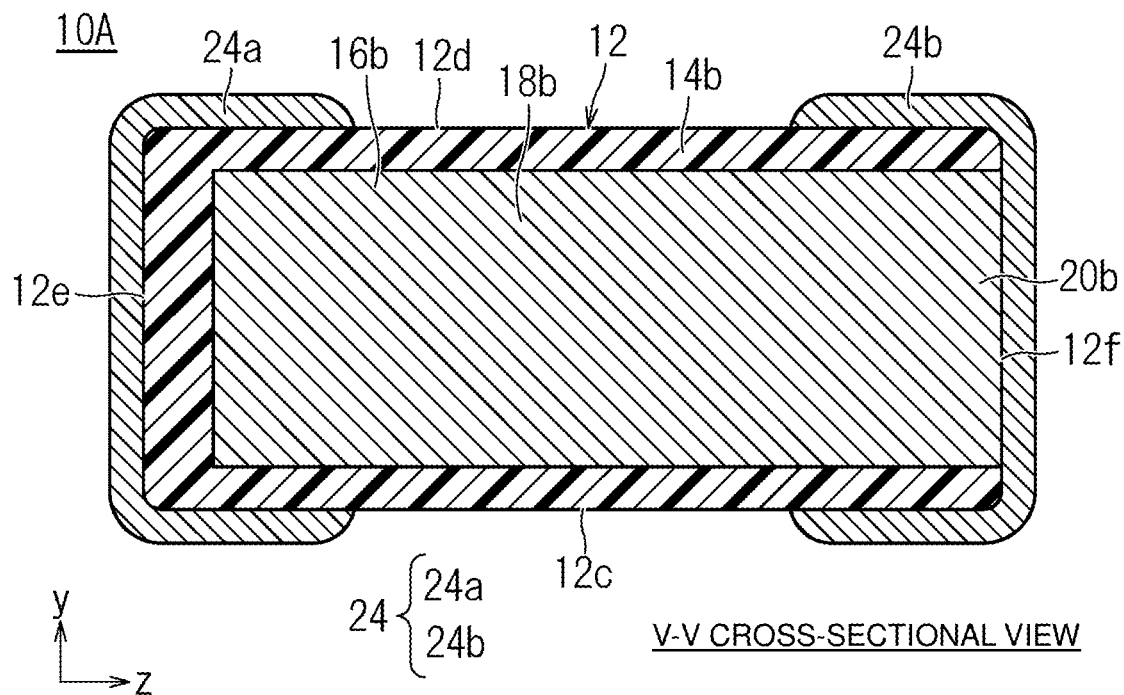
FIG. 5 V-V CROSS-SECTIONAL VIEW

ENLARGED VIEW OF PORTION A

ENLARGED VIEW OF PORTION B

ENLARGED VIEW OF PORTION C

ENLARGED VIEW OF PORTION D

XIX-XIX CROSS-SECTIONAL VIEW

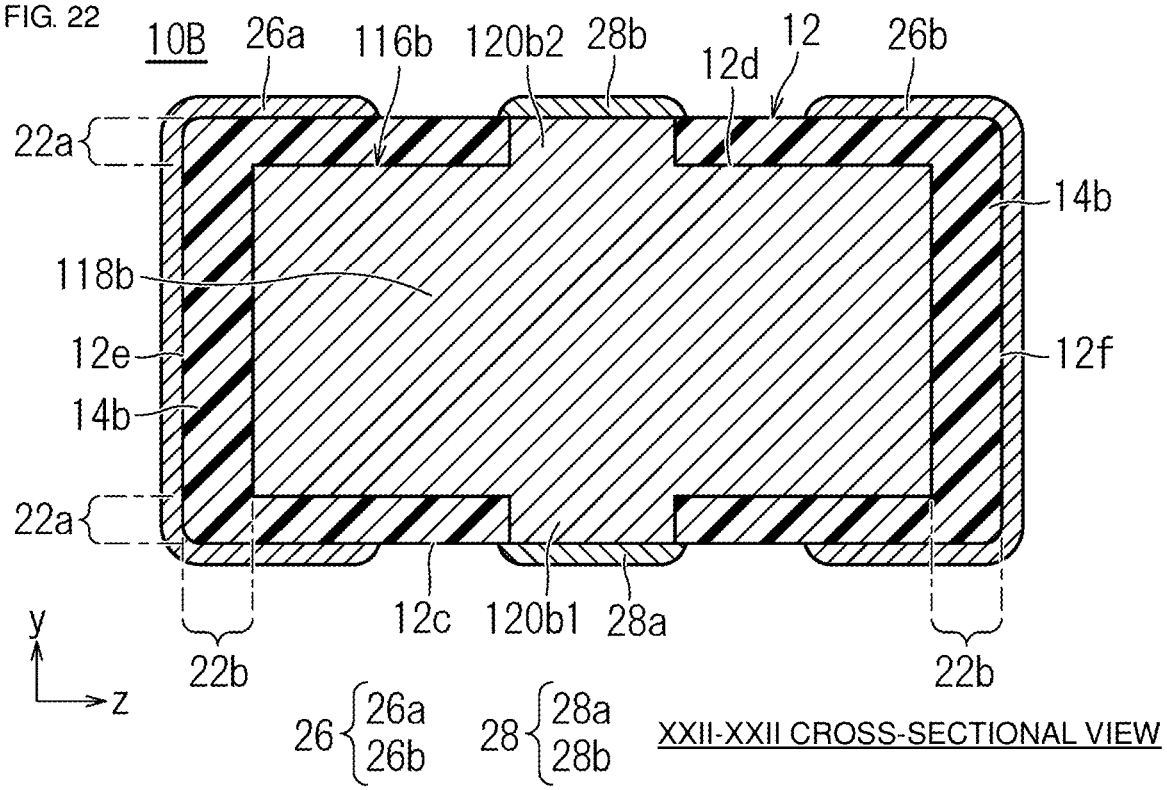
FIG. 22    XXII-XXII CROSS-SECTIONAL VIEW
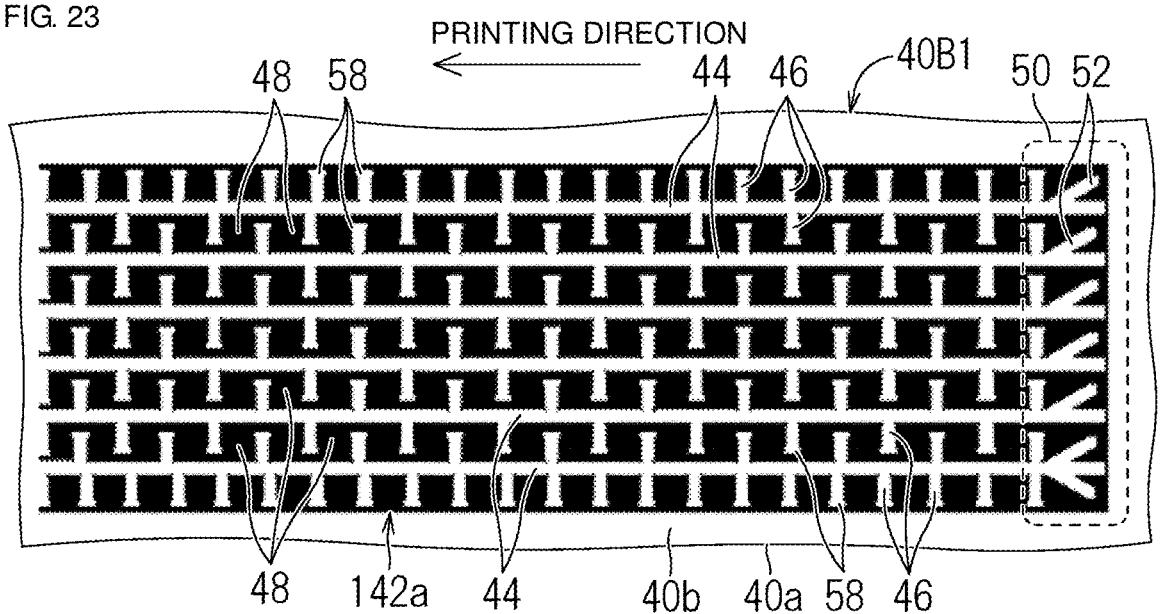
FIG. 23

PRINTING PLATE FOR GRAVURE PRINTING AND METHOD FOR MANUFACTURING MULTILAYER CERAMIC ELECTRONIC COMPONENT USING THE SAME

CROSS REFERENCE TO RELATED APPLICATIONS

This application claims the benefit of priority to Japanese Patent Application No. 2018-191788 filed on Oct. 10, 2018. The entire contents of this application are hereby incorporated herein by reference.

BACKGROUND OF THE INVENTION

1. Field of the Invention

The present invention relates to a printing plate for gravure printing in which a transferred material is transferred to a transferring target body, particularly relates to a printing plate for gravure printing which is used for gravure printing of an inner electrode pattern on a dielectric green sheet defining a multilayer ceramic electronic component, and a method of manufacturing a multilayer ceramic electronic component that forms an inner electrode pattern on a dielectric green sheet by the printing plate for gravure printing.

2. Description of the Related Art

In an existing case that an inner electrode pattern of a multilayer ceramic electronic component is printed by gravure printing, a hollow recessed portion conforming to a shape of the inner electrode pattern to be printed is formed, the recessed portion is filled with a conductive paste for the inner electrode, and the paste is transferred to a surface of a dielectric green sheet.

However, such a printing plate has problems in that, due to an error of the conductive paste for being filled, a size error of the recessed portion and a process condition, a shape of the transferred conductive paste for the inner electrode is blurred, and does not coincide with the shape of the inner electrode which is set beforehand.

Accordingly, for example, as disclosed in Japanese Unexamined Patent Application Publication No. 6-316174, a technique is described in which the recessed portion formed on the printing plate for gravure printing is shaped into a collection of a plurality of arrayed small recessed portions.

However, as illustrated in FIG. 1 and FIG. 5 of Japanese Unexamined Patent Application Publication No. 6-316174, when a cell is defined in a substantially quadrangular shape parallel to a printing direction, although the above problem is improved to some extent, since each of the recessed portions are completely defined by a ridge, a flow of the conductive paste into the plurality of recessed portions deteriorates. Therefore, it is difficult to fill the recessed portion with the conductive paste, and there is concern that a print blur in which the conductive paste is not partially applied to a ceramic green sheet is caused.

In addition, a recessed portion defining and functioning as a print starting end section (print starting end portion) of the inner electrode of the printing plate for gravure printing is less likely to be supplied with the conductive paste, and tends to fall into a conductive paste shortage. Furthermore, to a portion where the conductive paste is first transferred to the ceramic green sheet, unlike other portions, since there is no flow of the conductive paste from surrounding cells (that is, since printing from a bank to which the conductive paste is not supplied is performed), the conductive paste is less likely to be transferred in the first place. As described above, the problem of the print blur in which the conductive paste is not partially applied to the ceramic green sheet at the print starting end section of the inner electrode easily occurs.

Furthermore, normally, when the inner electrode is printed with the printing plate for gravure printing with the recessed portions defined by the ridges as disclosed in Japanese Unexamined Patent Application Publication No. 6-316174, although the ridge portion defines and functions as a transfer trigger and the conductive paste is transferred to the ceramic green sheet, when an opening area of the recessed portion increases in the pattern of the printing plate for gravure printing illustrated in FIG. 1 and FIG. 5 of Japanese Unexamined Patent Application Publication No. 6-316174, the transfer trigger of the conductive paste cannot be sufficiently obtained and the conductive paste is not sufficiently transferred to the ceramic green sheet in some cases. As a result, this is considered to lead to a problem of the print blur in which the conductive paste is not partially applied to the ceramic green sheet.

On the other hand, as illustrated in FIG. 6 of Japanese Unexamined Patent Application Publication No. 6-316174, when the cell is defined in a substantially quadrangular shape with an angle with respect to the printing direction, since the ridge defining and functioning as the transfer trigger of the conductive paste first comes into contact with the ceramic green sheet, the transfer trigger is easy to be obtained, but in the same manner as the pattern of the printing plate for gravure printing illustrated in FIG. 1 and FIG. 5 of Japanese Unexamined Patent Application Publication No. 6-316174, since each of the recessed portions is completely defined by the ridge, the flow of the conductive paste deteriorates, and thus the plurality of recessed portions is less likely to be filled with the conductive paste. In addition, when the cell is defined in the substantially quadrangular shape with the angle, a cell at a print starting position has a substantially triangular shape, and an opening area decreases. As a result, a conductive paste amount required for the transfer cannot be obtained. Accordingly, there is concern that these lead to the problem of the print blur in which the conductive paste is not partially applied to the ceramic green sheet.

SUMMARY OF THE INVENTION

Preferred embodiments of the present invention provide a printing plate for gravure printing which does not result in a print blur while ensuring fluidity of a conductive paste, and a method of manufacturing a multilayer ceramic electronic component by the printing plate for gravure printing.

A printing plate for gravure printing according to a preferred embodiment of the present invention is a printing plate for gravure printing in which a printing paste is applied on a printing object to be a predetermined graphic pattern by a gravure printing method, the printing plate for gravure printing includes a gravure roll with a cylindrical or substantially cylindrical shape, in which a plurality of printing portions corresponding to a graphic pattern to be printed is provided on an outer circumferential surface of the gravure roll, each of the plurality of printing portions includes a plurality of first banks each extending in a parallel or substantially parallel direction to a rotation direction, a plurality of second banks each extending in a direction orthogonal or substantially orthogonal to the rotation direction and in each of which at least one end portion is connected to the plurality of first banks, and a plurality of cells defined by the plurality of first banks and the plurality of second banks, and in the cell located at a print starting end portion of each of the plurality of printing portions which first comes into contact with the printing object in the rotation direction, a partition bank which divides the cell in a diagonal direction is provided.

Furthermore, a method of manufacturing a multilayer ceramic electronic component according to a preferred embodiment of the present invention is a method of manufacturing a multilayer ceramic electronic component, the multilayer ceramic electronic component including a multilayer body including a plurality of laminated ceramic layers and a plurality of laminated inner electrode layers, and outer electrodes located at both end portions of the multilayer body, the method of manufacturing the multilayer ceramic electronic component includes printing an inner electrode pattern on a ceramic green sheet with a printing plate for gravure printing according to a preferred embodiment of the present invention.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 4 is a cross-sectional view taken along a line IV-IV in FIG. 2.

FIG. 5 is a cross-sectional view taken along a line V-V in FIG. 2.

FIG. 22 is a cross-sectional view taken along a line XXII-XXII in FIG. 19.

FIG. 23 is a diagram of the printing plate for gravure printing according to the second preferred embodiment of the present invention, and is a plan view showing a printing portion that defines a first inner electrode layer shown in FIG. 21.

DETAILED DESCRIPTION OF THE PREFERRED EMBODIMENTS

Electronic components manufactured using gravure printing plates according to preferred embodiments of the present invention will be described with reference to the accompanying drawings. In the preferred embodiments, a multilayer ceramic capacitor is described as an example of a multilayer ceramic electronic component.

First Preferred Embodiment

1. Multilayer Ceramic Capacitor

A gravure printing machine including a printing plate for gravure printing or a multilayer ceramic capacitor (two-terminal type multilayer ceramic capacitor) which is a multilayer ceramic electronic component manufactured according to a method of manufacturing a multilayer ceramic electronic component of the first preferred embodiment of the present invention will be described.

Figure 1:
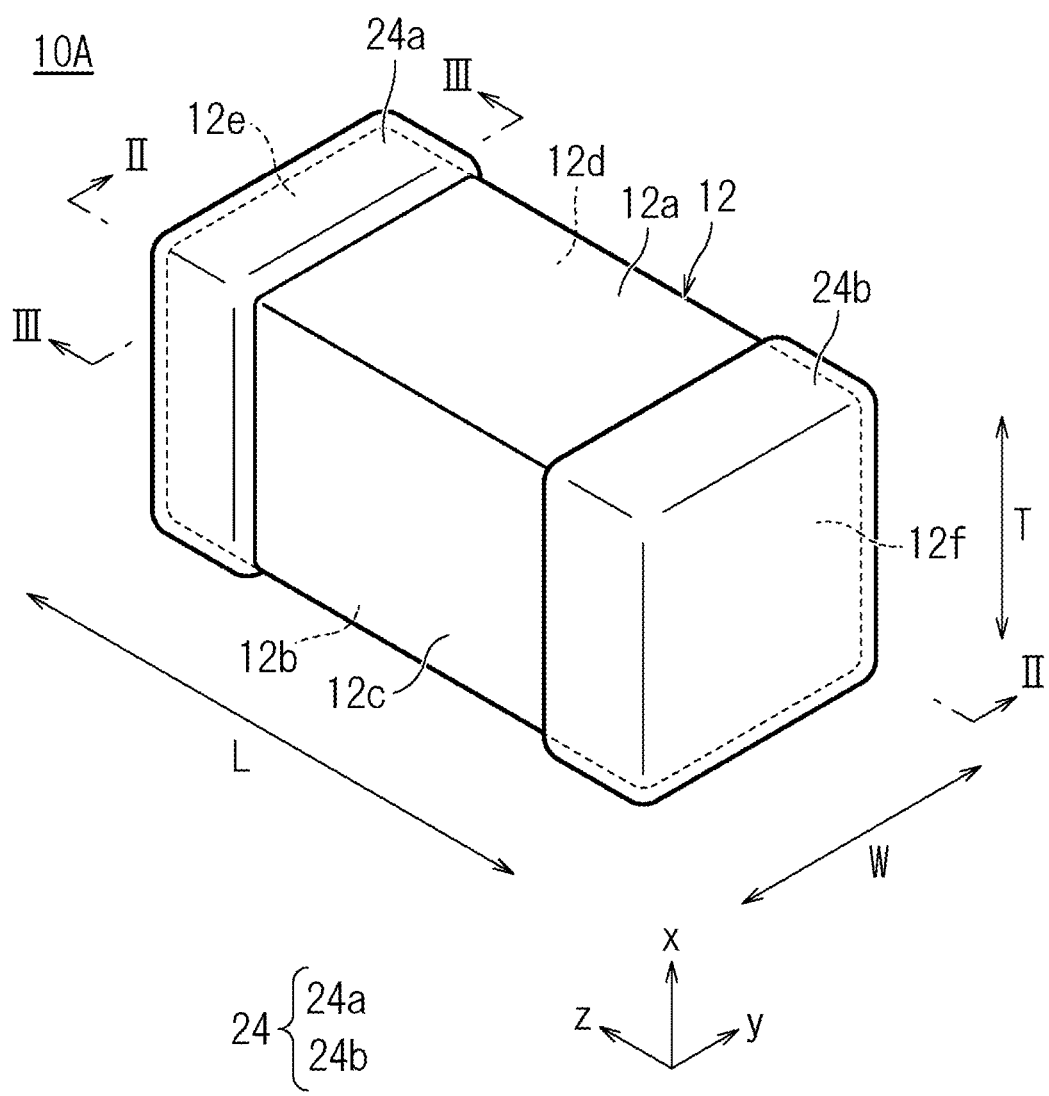
FIG. 1 is an external perspective view showing an example of a multilayer ceramic capacitor manufactured using a printing plate for gravure printing according to a first preferred embodiment of the present invention.
Figure 2:
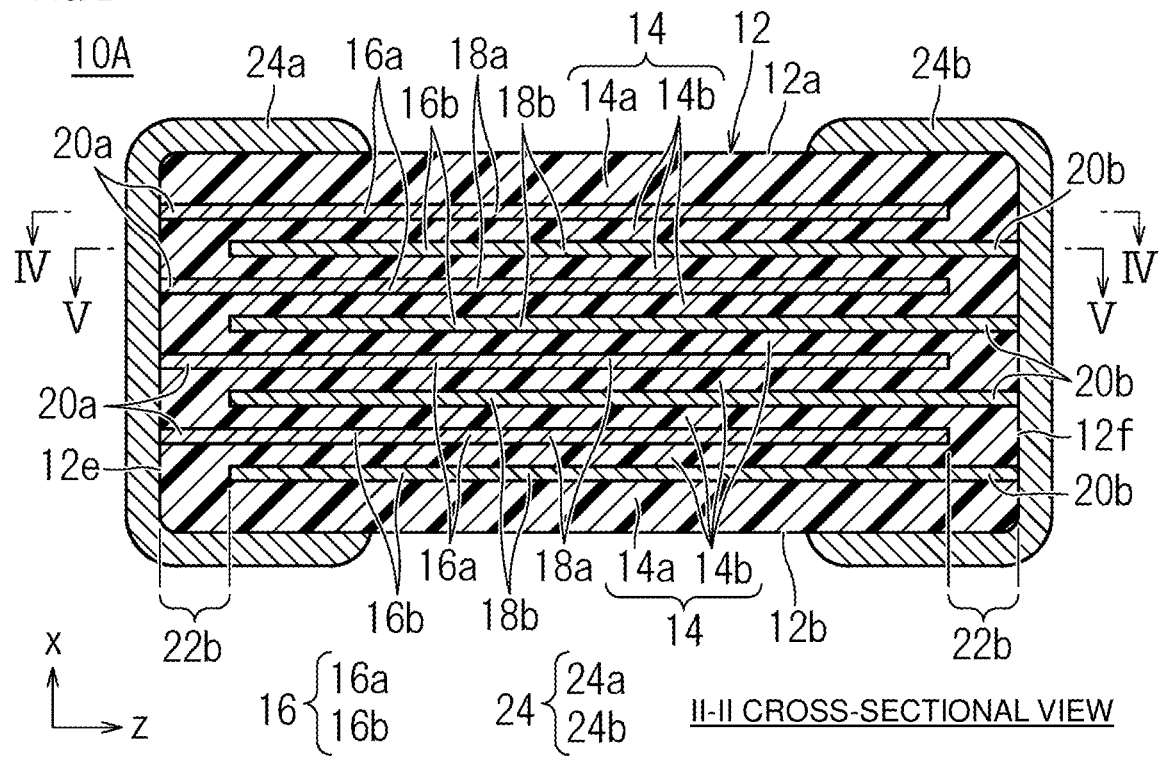
FIG. 2 is a cross-sectional view taken along a line II-II in FIG. 1.
Figure 3:
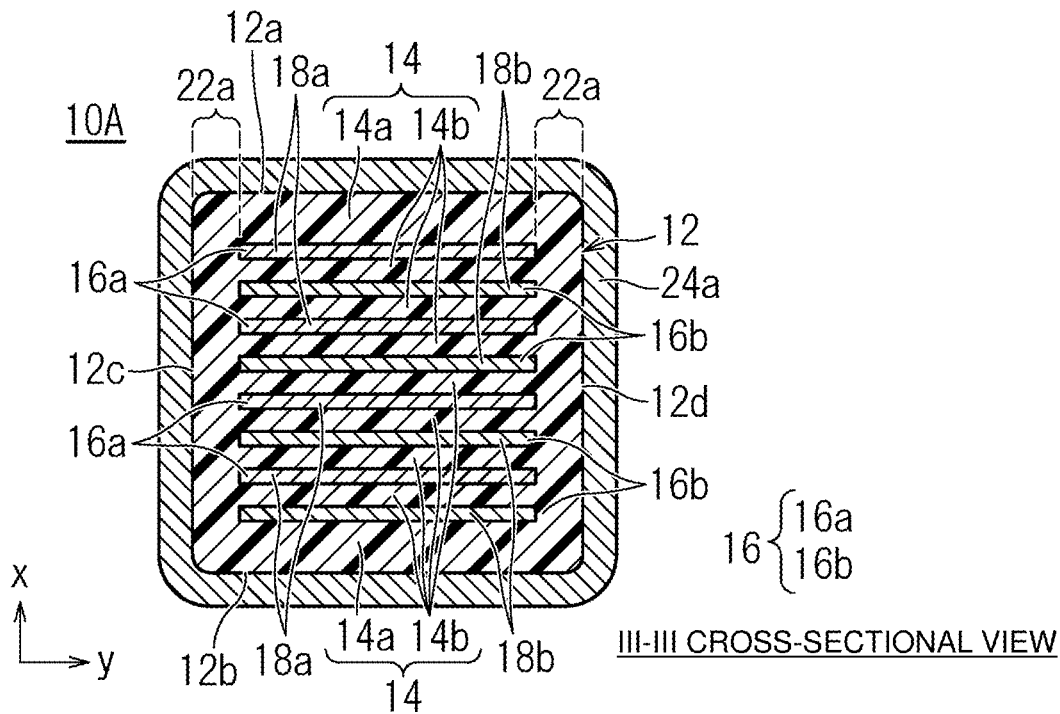
FIG. 3 is a cross-sectional view taken along a line III-III in FIG. 1.

FIG. 1 is an external perspective view showing an example of the multilayer ceramic capacitor (two-terminal type multilayer ceramic capacitor) manufactured using the printing plate for gravure printing according to the first preferred embodiment of the present invention. FIG. 2 is a cross-sectional view taken along a line II-II in FIG. 1. FIG. 3 is a cross-sectional view taken along a line III-III in FIG. 1. FIG. 4 is a cross-sectional view taken along a line IV-IV in FIG. 2. FIG. 5 is a cross-sectional view taken along a line V-V in FIG. 2.

As shown in FIG. 1 to FIG. 3, a multilayer ceramic capacitor 10A includes a multilayer body 12 with a rectangular or substantially rectangular parallelepiped shape.

The multilayer body 12 includes a plurality of ceramic layers 14 and a plurality of inner electrode layers 16 which are laminated. Furthermore, the multilayer body 12 includes a first main surface 12a and a second main surface 12b facing each other in a lamination direction x, a first side surface 12c and a second side surface 12d facing each other in a width direction y which is orthogonal or substantially orthogonal to the lamination direction x, and a first end surface 12e and a second end surface 12f facing each other in a length direction z which is orthogonal or substantially orthogonal to the lamination direction x and the width direction y. The multilayer body 12 preferably includes corner portions and ridge line portions which are substantially rounded. Note that the corner portion refers to a portion where three adjacent surfaces of the multilayer body intersect with one another, and the ridge line portion refers to a portion where two adjacent surfaces of the multilayer body intersect with each other. In addition, unevenness or the like may be included in a portion of or all of the first main surface 12a and the second main surface 12b, the first side surface 12c and the second side surface 12d, and the first end surface 12e and the second end surface 12f. Furthermore, in the multilayer body 12, a dimension in the length direction z is not necessarily longer than a dimension in the width direction y.

The number of ceramic layers 14 to be laminated is not particularly limited, but is preferably equal to or more than approximately 50 and equal to or less than approximately 1200, for example.

The multilayer body 12 includes an outer layer portion 14a including a plurality of ceramic layers 14, and an inner layer portion 14b including a single layer or a plurality layers of the ceramic layers 14 and the plurality of inner electrode layers 16 provided thereon. The outer layer portion 14a is located on each of the first main surface 12a side and the second main surface 12b side of the multilayer body 12, and is a collection of the plurality of ceramic layers 14 located between the first main surface 12a and the inner electrode layer 16 closest to the first main surface 12a, and the plurality of ceramic layers 14 located between the second main surface 12b and the inner electrode layer 16 closest to the second main surface 12b. Additionally, a region sandwiched between both of the outer layer portions 14a is the inner layer portion 14b.

Although the dimension of the multilayer body 12 is not particularly limited, for example, the dimension in the length direction z is preferably equal to or more than approximately 0.375 mm and equal to or less than approximately 3.40 mm, the dimension in the width direction y is preferably equal to or more than approximately 0.18 mm and equal to or less than approximately 2.60 mm, and the dimension in the lamination direction x is preferably equal to or more than approximately 0.18 mm and equal to or less than approximately 2.60 mm.

The ceramic layer 14 may preferably include, for example, a dielectric material. As such a dielectric material, for example, a dielectric ceramics including components such as $BaTiO_3$, $CaTiO_3$, $SrTiO_3$, or $CaZrO_3$, may preferably be included. When the above-described dielectric material is included as a main component, in accordance with predetermined characteristics of the multilayer body 12, for example, a material to which a secondary component, such as an Mn compound, an Fe compound, a Cr compound, a Co compound, or an Ni compound, is added at a smaller content than the main component may be included.

Note that when piezoelectric ceramics are included in the multilayer body 12, the multilayer ceramic electronic component defines and functions as a ceramic piezoelectric element. As a specific example of the piezoelectric ceramic material, for example, a PZT (lead zirconate titanate) based ceramic material or the like may be included.

Additionally, when semiconductor ceramics are included in the multilayer body 12, the multilayer ceramic electronic component defines and functions as a thermistor element. As a specific example of the semiconductor ceramic material, for example, a spinel based ceramic material or the like may be included.

Additionally, when magnetic ceramics are included in the multilayer body 12, the multilayer ceramic electronic component defines and functions as an inductor element. In addition, when defining and functioning as the inductor element, the inner electrode layer 16 is a conductor with a coil or substantially coil shape. As a specific example of the magnetic ceramic material, for example, a ferrite ceramic material or the like may be included.

A thickness of the ceramic layer 14 after firing is preferably equal to or more than approximately 0.5 μm and equal to or less than approximately 7.0 μm, for example.

The multilayer body 12 includes, as the plurality of inner electrode layers 16, for example, a plurality of first inner electrode layers 16a and a plurality of second inner electrode layers 16b each with a rectangular or substantially rectangular shape. The plurality of first inner electrode layers 16a and the plurality of second inner electrode layers 16b are embedded and alternately located at equal or substantially equal intervals along the lamination direction x of the multilayer body 12.

The first inner electrode layer 16a includes a first opposite electrode portion 18a opposing the second inner electrode layer 16b, and a first extended electrode portion 20a located on one end side of the first inner electrode layer 16a and between the first opposite electrode portion 18a and the first end surface 12e of the multilayer body 12. An end portion of the first extended electrode portion 20a is extended to the first end surface 12e and is exposed.

The second inner electrode layer 16b includes a second opposite electrode portion 18b opposing the first inner electrode layer 16a, and a second extended electrode portion 20b located on one end side of the second inner electrode layer 16b and between the second opposite electrode portion 18b and the second end surface 12f of the multilayer body 12. An end portion of the second extended electrode portion 20b is extended to the second end surface 12f and is exposed.

A shape of each of the first opposite electrode portion 18a of the first inner electrode layer 16a and the second opposite electrode portion 18b of the second inner electrode layer 16b is not particularly limited, but is preferably a rectangular or substantially rectangular shape, for example. Note that a corner portion may have a substantially rounded shape, or the corner portion may have a substantially oblique shape (a substantially tapered shape).

A shape of each of the first extended electrode portion 20a of the first inner electrode layer 16a and the second extended electrode portion 20b of the second inner electrode layer 16b is not particularly limited, but is preferably a rectangular or substantially rectangular shape, for example. Note that a corner portion may have a substantially rounded shape, or the corner portion may has a substantially oblique shape (a substantially tapered shape).

The first opposite electrode portion 18a of the first inner electrode layer 16a and the first extended electrode portion 20a of the first inner electrode layer 16a may have the same or substantially the same width as each other, or any one of them may have a narrower width. Similarly, the second opposite electrode portion 18b of the second inner electrode layer 16b and the second extended electrode portion 20b of the second inner electrode layer 16b may have the same or substantially the same width as each other, or any one of them may have a narrower width.

The multilayer body 12 includes side portions (W gaps) 22a of the multilayer body 12 which are located, respectively, between one ends of the first opposite electrode portion 18a and the second opposite electrode portion 18b in the width direction y and the first side surface 12c and between the other ends of the first opposite electrode portion 18a and the second opposite electrode portion 18b in the width direction y and the second side surface 12d. Furthermore, the multilayer body 12 includes end portions (L gaps) 22b of the multilayer body 12 which are located, respectively, between an end portion of the first inner electrode layer 16a on an opposite side from the first extended electrode portion 20a and the second end surface 12f and between an end portion of the second inner electrode layer 16b on an opposite side from the second extended electrode portion 20b and the first end surface 12e.

The inner electrode layer 16 preferably includes an appropriate conductive material, for example, a metal such as Ni, Cu, Ag, Pd, or Au, an alloy including at least one kind of those metals such as an Ag—Pd alloy, or the like. As a resin component included in an inner electrode conductive paste that defines the inner electrode layer 16, ethyl cellulose or a polyvinyl butyral resin, for example, is preferably included.

A thickness of the inner electrode layer 16 is preferably equal to or more than approximately 0.2 µm and equal to or less than approximately 2.0 µm, for example. Additionally, the number of inner electrode layers 16 is preferably equal to or more than approximately 15 and equal to or less than approximately 1700, for example.

An outer electrode 24 is provided on each of the first end surface 12e side and the second end surface 12f side of the multilayer body 12. The outer electrode 24 includes a first outer electrode 24a and a second outer electrode 24b.

The first outer electrode 24a is provided on a surface of the first end surface 12e of the multilayer body 12 and extends from the first end surface 12e and covers a portion of each of the first main surface 12a, the second main surface 12b, the first side surface 12c, and the second side surface 12d. In this case, the first outer electrode 24a is electrically connected to the first extended electrode portion 20a of the first inner electrode layer 16a. Note that the first outer electrode 24a may be provided only on the first end surface 12e of the multilayer body 12.

The second outer electrode 24b is provided on a surface of the second end surface 12f of the multilayer body 12 and extends from the second end surface 12f and covers a portion of each of the first main surface 12a, the second main surface 12b, the first side surface 12c, and the second side surface 12d. In this case, the second outer electrode 24b is electrically connected to the second extended electrode portion 20b of the second inner electrode layer 16b. Note that the second outer electrode 24b may be provided only on the second end surface 12f of the multilayer body 12.

In the multilayer body 12, the first opposite electrode portion 18a of the first inner electrode layer 16a and the second opposite electrode portion 18b of the second inner electrode layer 16b oppose each other with the ceramic layer 14 interposed therebetween, thus defining a electrostatic capacity. Therefore, the electrostatic capacity produced between the first outer electrode 24a to which the first inner electrode layer 16a is connected and the second outer electrode 24b to which the second inner electrode layer 16b is connected, and characteristics of a capacitor appears.

Figure 6A:
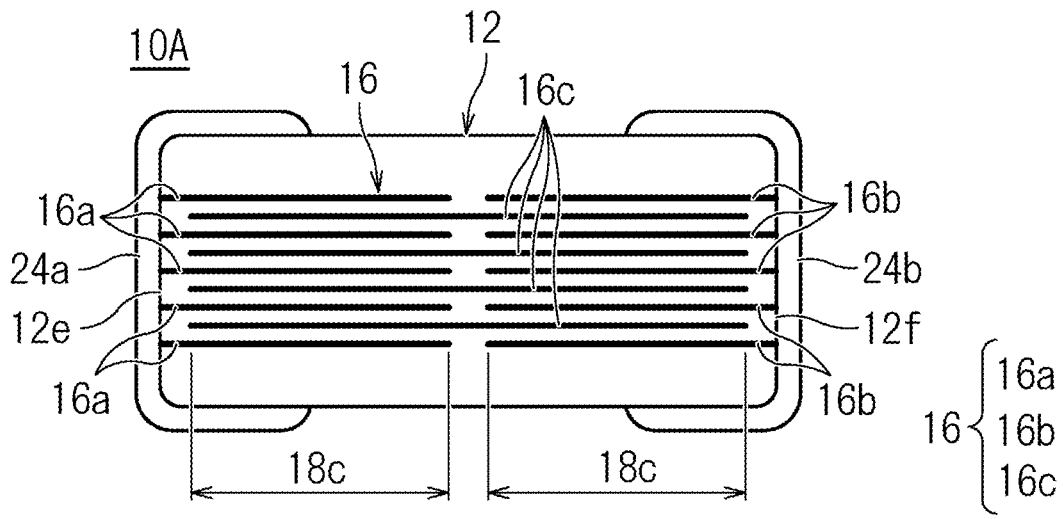
FIG. 6A is a cross-sectional view, which shows a structure in which an opposite electrode portion of an inner electrode layer of the multilayer ceramic capacitor according to the first preferred embodiment of the present invention is divided into two portions, taken along a line II-II in FIG. 1.
Figure 6B:
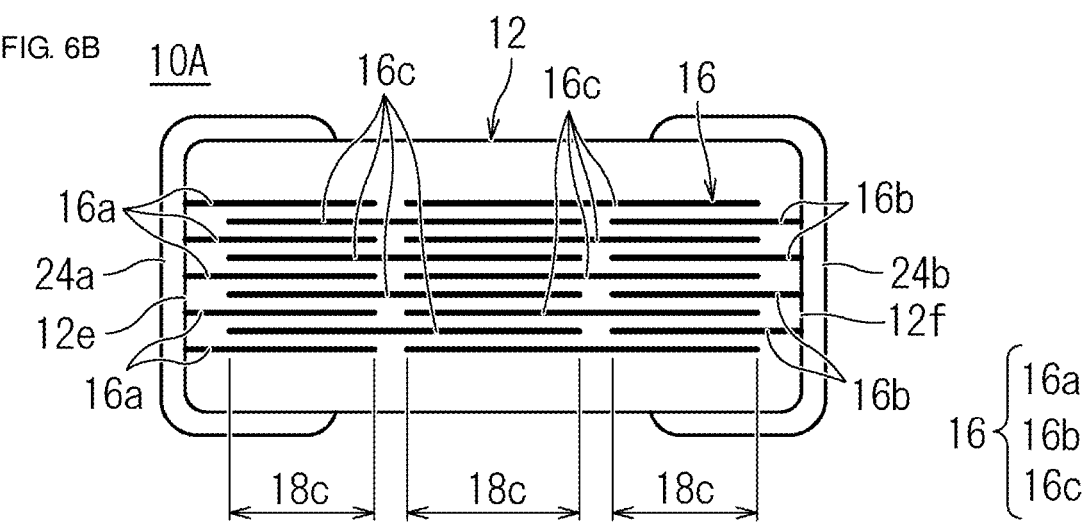
FIG. 6B is a cross-sectional view, which shows a structure in which the opposite electrode portion of the inner electrode layer of the multilayer ceramic capacitor according to the first preferred embodiment of the present invention is divided into three portions, taken along a line II-II in FIG. 1.
Figure 6C:
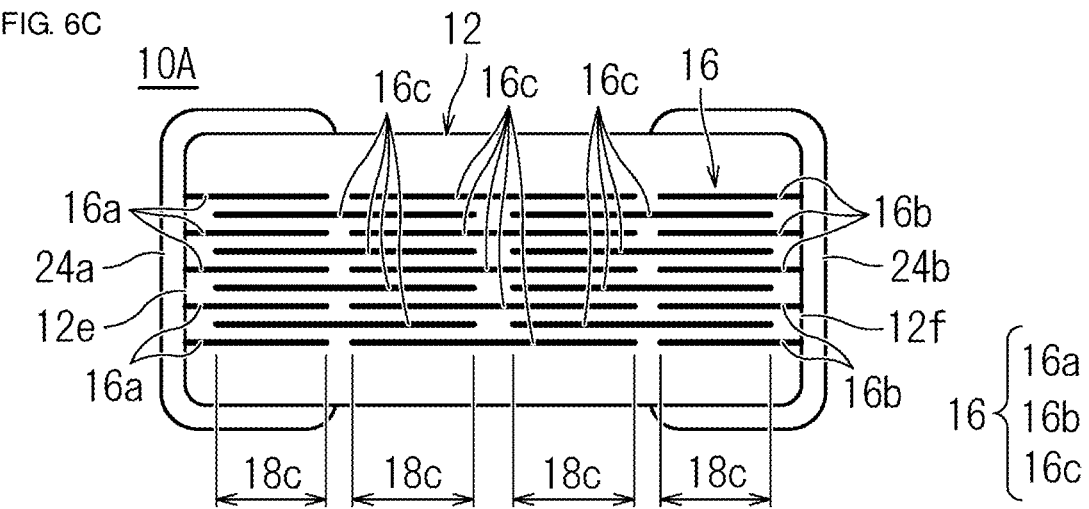
FIG. 6C is a cross-sectional view, which shows a structure in which the opposite electrode portion of the inner electrode layer of the multilayer ceramic capacitor according to the first preferred embodiment of the present invention is divided into four portions, taken along a line II-II in FIG. 1.

Note that as shown in FIGS. 6A to 6C, a structure may be provided in which, as the inner electrode layer 16, in addition to the first inner electrode layer 16a and the second inner electrode layer 16b, a floating inner electrode layer 16c which is not extended to any of the first end surface 12e and the second end surface 12f is provided, and a plurality of opposite electrode portions 18c are defined by division by the floating inner electrode layer 16c. Examples include structures with two series as shown in FIG. 6A, three series as shown in FIG. 6B, and four series as shown in FIG. 6C, and a structure with four or more series is able to also be implemented. As described above, by including a structure in which the plurality of opposite electrode portions 18c are defined by division, a plurality of capacitor components are provided among the inner electrode layers 16a, 16b, and 16c opposing one another, and a structure in which these capacitor components are connected in series is provided. Therefore, a voltage applied to each of the capacitor components decreases, and a breakdown voltage of the multilayer ceramic capacitor is able to be increased.

The first outer electrode 24a and the second outer electrode 24b each include a base electrode layer and a plating layer provided on a surface of the base electrode layer.

Each of the base electrode layers preferably includes, for example, at least one selected from a baked layer, a conductive resin layer, a thin film layer, and the like.

First, the base electrode layer including a first base electrode layer and a second base electrode layer which are formed of the baked layer is described.

The baked layer preferably includes glass and a metal. The metal of the baked layer preferably includes, for example, at least one selected from Cu, Ni, Ag, Pd, an Ag—Pd alloy, Au, and the like. Furthermore, the glass of the baked layer preferably includes at least one selected from B, Si, Ba, Mg, Al, Li and the like. The baked layer may include a plurality of layers. The baked layer is a layer provided by a conductive paste including the glass and the metal being applied to the multilayer body 12 and baked, may be a layer provided by being fired at the same or substantially the same time as the ceramic layer 14 and the inner electrode layer 16, or may be a layer provided by being baked after the ceramic layer 14 and the inner electrode layer 16 are fired.

A thickness of each of the baked layers of the base electrode layers at the central portions in the height direction respectively located on the first end surface 12e and the second end surface 12f is preferably equal to or more than approximately 15 µm and equal to or less than approximately 160 µm, for example.

In addition, in a case where the base electrode layer is provided on the surfaces of the first main surface 12a and the second main surface 12b, and the first side surface 12c and the second side surface 12d, a thickness of each of the baked layers, which are the first base electrode layer and the second base electrode layer each located on the surfaces of the first main surface 12a and the second main surface 12b, and the first side surface 12c and the second side surface 12d, in each of the central portions in the length direction is preferably equal to or more than approximately 5 µm and equal to or less than approximately 40 µm, for example.

Next, the base electrode layer including the first base electrode layer and the second base electrode layer which are made of the conductive resin layer is described.

The conductive resin layer may be provided on the surface of the baked layer to cover the baked layer, or may be directly provided on the surface of the multilayer body 12.

The conductive resin layer preferably includes a thermosetting resin and a metal. The conductive resin layer includes the thermosetting resin, and is therefore more flexible than a plating film or a conductive layer including a fired material of a conductive paste, for example. Accordingly, even when a physical impact or an impact due to a thermal cycle is applied to the multilayer ceramic capacitor, the conductive resin layer defines and functions as a buffer layer, and cracks in the multilayer ceramic capacitor are able to be reduced or prevented.

As the metal included in the conductive resin layer, for example, Ag, Cu, or an alloy thereof may preferable be used. Additionally, metal powder whose surface is coated with Ag may be used. When the metal powder whose surface is coated with Ag is used, Cu or Ni, for example, is preferably included as the metal powder. In addition, a material provided by subjecting Cu to an oxidation preventing treatment may be included. In particular, including a conductive metal powder of Ag as a metal in the conductive resin layer is preferable because Ag has the lowest specific resistance among metals and is suitable for an electrode material, and Ag is a noble metal which is not oxidized and has high weather resistance. Note that the metal coated with Ag is preferably included as the metal included in the conductive resin layer, since an inexpensive metal is able to be included as the metal of the base material while maintaining the characteristics of Ag described above.

The metal is preferably included in the conductive resin layer in a content of, for example, equal to or more than approximately 35 vol % and equal to or less than approximately 75 vol % with respect to a volume of the entire conductive resin.

A shape of the metal (conductive filler) included in the conductive resin layer is not particularly limited. The conductive filler with a substantially spherical shape, a substantially flat shape, or the like, for example, may be included, but the substantially spherical metal powder and the substantially flat metal powder are preferably mixed and included.

An average particle diameter of the metal (conductive filler) included in the conductive resin layer is not particularly limited. The average particle diameter of the conductive filler may preferably be, for example, equal to or more than approximately 0.3 µm and equal to or less than approximately 10 µm.

The metal (conductive filler) included in the conductive resin layer provides conductivity of the conductive resin layer. Specifically, by the conductive fillers contacting with each other, an electrical path is defined inside the conductive resin layer.

As a resin of the conductive resin layer, for example, various known thermosetting resins such as an epoxy resin, a phenol resin, a urethane resin, a silicone resin, and a polyimide resin may preferably be included. Among these resins, the epoxy resin excellent in heat resistance, moisture resistance, a close contact property, and the like is one of the suitable resins.

The resin is preferably included in the conductive resin layer in a content of, for example, equal to or more than approximately 25 vol % and equal to or less than approximately 65 vol % with respect to the volume of the entire conductive resin.

Furthermore, the conductive resin layer preferably includes a curing agent together with the thermosetting resin. When the epoxy resin is included as a base resin, various known compounds such as, for example, a phenol resin, an amine-based compound, an acid anhydride-based compound, and an imidazole-based compound is able to be included as the curing agent of the epoxy resin.

A thickness of each of the conductive resin layers of the base electrode layers at the central portions in the height direction respectively located on the first end surface 12e and the second end surface 12f is, for example, preferably equal to or more than approximately 10 µm and equal to or less than approximately 120 µm.

In addition, in a case where the base electrode layer is provided on the surfaces of the first main surface 12a and the second main surface 12b, and the first side surface 12c and the second side surface 12d, a thickness of each of the conductive resin layers, which are the base electrode layers each located on the surfaces of the first main surface 12a and the second main surface 12b, and the first side surface 12c and the second side surface 12d, in each of the central portions in the length direction is preferably equal to or more than approximately 5 µm and equal to or less than approximately 40 µm, for example.

In addition, in a case where the base electrode layer is the thin film layer, the thin film layer is preferably formed according to a thin film formation method such as a sputtering method or a vapor deposition method, and is a layer, for example, with a thickness of equal to or less than approximately 1 µm formed by metal particles being deposited.

Furthermore, the plating layer includes, for example, at least one selected from Cu, Ni, Sn, Ag, Pd, an Ag—Pd alloy, Au, and the like.

The plating layer may include a plurality of layers. In this case, the plating layer preferably includes a double-layer structure including an Ni plating layer and an Sn plating layer, for example. By providing the Ni plating layer to cover the surface of the base electrode layer, the base electrode layer is able to be significantly reduced or prevented from being eroded by solder that mounts the multilayer ceramic capacitor 10A. Furthermore, by providing the Sn plating layer on a surface of the Ni plating layer, wettability of the solder that mounts the multilayer ceramic capacitor 10A is able be significantly improved, and the mounting is able to be performed with ease.

A thickness per one plating layer is preferably equal to or more than approximately 2 µm and equal to or less than approximately 15 µm, for example.

Note that the outer electrode 24 may include only the plating layer without providing the base electrode layer. Hereinafter, a structure in which the plating layer is provided without providing the base electrode layer will be described.

In each of the first outer electrode 24a and the second outer electrode 24b, the base electrode layer may not be provided, and the plating layer may be directly provided on the surface of the multilayer body 12. In other words, the multilayer ceramic capacitor 10A may have a structure including the plating layer electrically connected to the first inner electrode layer 16a or the second inner electrode layer 16b. In such a case, a catalyst may be provided on the surface of the multilayer body 12 as a pretreatment, and then the plating layer may be formed.

The plating layer preferably includes a lower layer plating electrode provided on the surface of the multilayer body 12 and an upper layer plating electrode provided on a surface of the lower layer plating electrode.

The lower layer plating electrode and the upper layer plating electrode preferably each include, for example, at least one kind of metal selected from Cu, Ni, Sn, Pb, Au, Ag, Pd, Bi, Zn, and the like, or an alloy including these metals.

The lower layer plating electrode may preferably be made of Ni with solder barrier performance, and that the upper layer plating electrode may preferably be made of Sn or Au with good solder wettability, for example. In addition, for example, when the first inner electrode layer 16a and the second inner electrode layer 16b are made of Ni, the lower layer plating electrode is preferably made of Cu with good bonding property with Ni. Note that the upper layer plating electrode may be provided as necessary, and the first outer electrode 24a and the second outer electrode 24b may each include only of the lower layer plating electrode.

In the plating layer, the upper layer plating electrode may be included as an outermost layer, or another plating electrode may be further provided on a surface of the upper layer plating electrode.

A thickness per one plating layer provided without providing the base electrode layer is preferably equal to or more than approximately 1 µm and equal to or less than approximately 15 µm, for example. The plating layer preferably does not include glass. The metal proportion of the plating layer per unit volume is preferably equal to or more than approximately 99 vol %, for example.

A dimension in the length direction z of the multilayer ceramic capacitor 10A including the multilayer body 12, the first outer electrode 24a, and the second outer electrode 24b is taken as an L dimension, a dimension in the lamination direction x of the multilayer ceramic capacitor 10A including the multilayer body 12, the first outer electrode 24a, and the second outer electrode 24b is taken as a T dimension, and a dimension in the width direction y of the multilayer ceramic capacitor 10A including the multilayer body 12, the first outer electrode 24a, and the second outer electrode 24b is taken as a W dimension.

For the dimension of the multilayer ceramic capacitor 10A, for example, the L dimension in the length direction z is preferably equal to or more than approximately 0.40 mm and equal to or less than approximately 3.45 mm, the W dimension in the width direction y is preferably equal to or more than approximately 0.20 mm and equal to or less than approximately 2.65 mm, and the T dimension in the lamination direction x is preferably equal to or more than approximately 0.20 mm and equal to or less than approximately 2.65 mm.

Next, a gravure printing machine which manufactures the above-described multilayer ceramic capacitor 10A will be described.

2. Gravure Printing Machine

Figure 7:
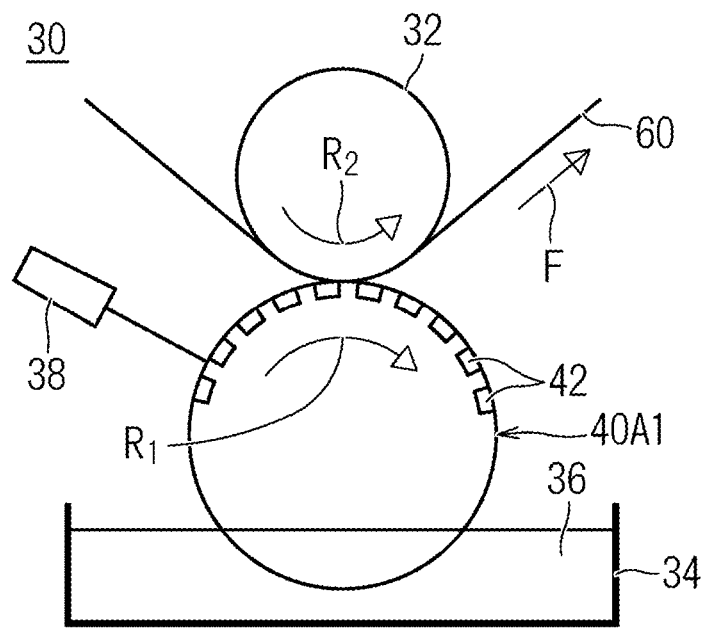
FIG. 7 is a diagram showing a gravure printing machine including the printing plate for gravure printing according to the first preferred embodiment of the present invention.

Referring to FIG. 7, for a gravure printing method, a gravure printing machine 30 including a printing plate 40A1 for gravure printing according to the first preferred embodiment of the present invention will be described.

(1) Gravure Printing Method

Figure 8:
FIG. 8 is a cross-sectional view showing a state in which a conductive paste film is provided on a ceramic green sheet backed by a carrier film as a printing target portion by the gravure printing machine shown in FIG. 7.
Figure 9:
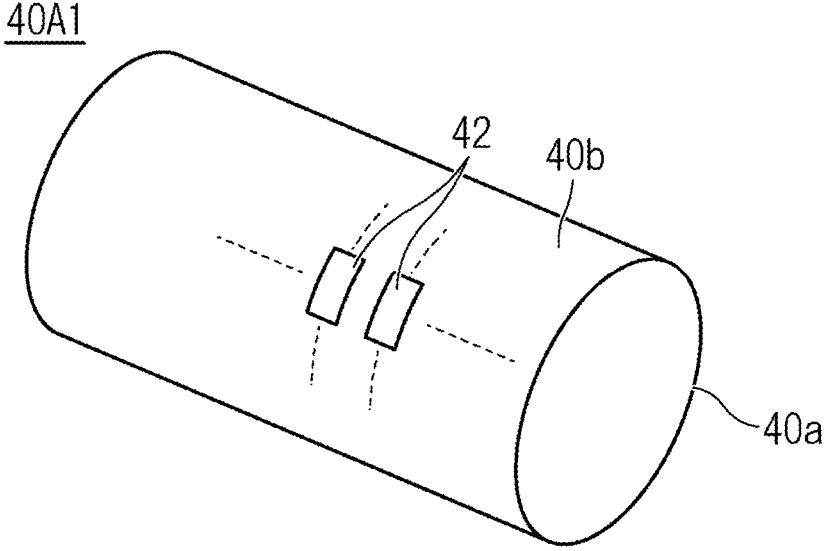
FIG. 9 is a perspective view showing the printing plate for gravure printing shown in FIG. 7 alone.
Figure 10:
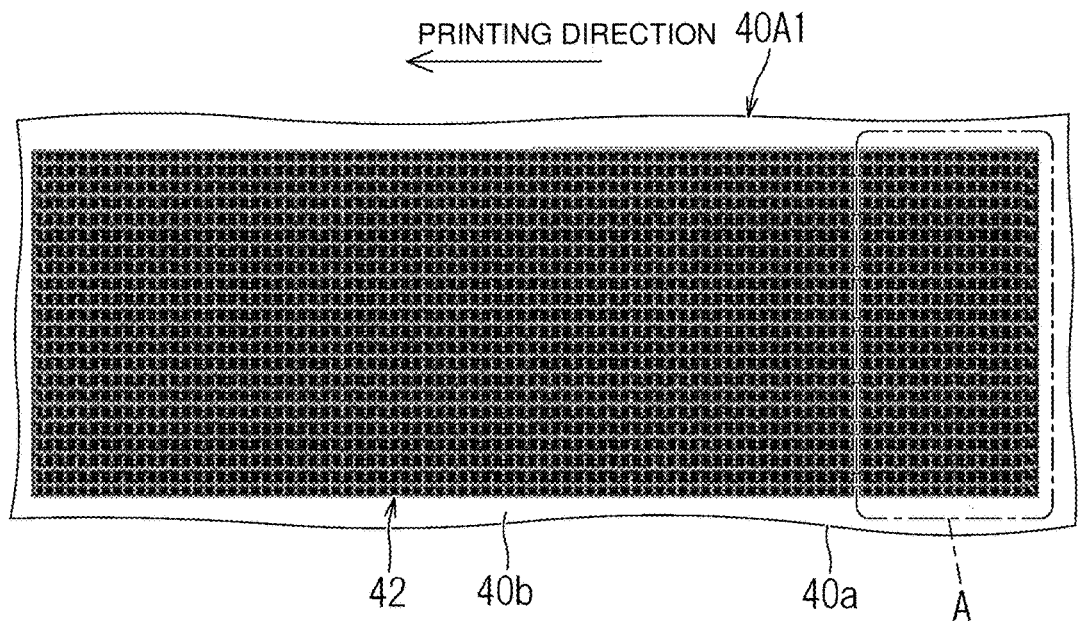
FIG. 10 is an expanded view of an outer circumferential surface of the printing plate for gravure printing, showing one printing portion provided on the printing plate for gravure printing shown in FIG. 9 in an enlarged view.
Figure 11:
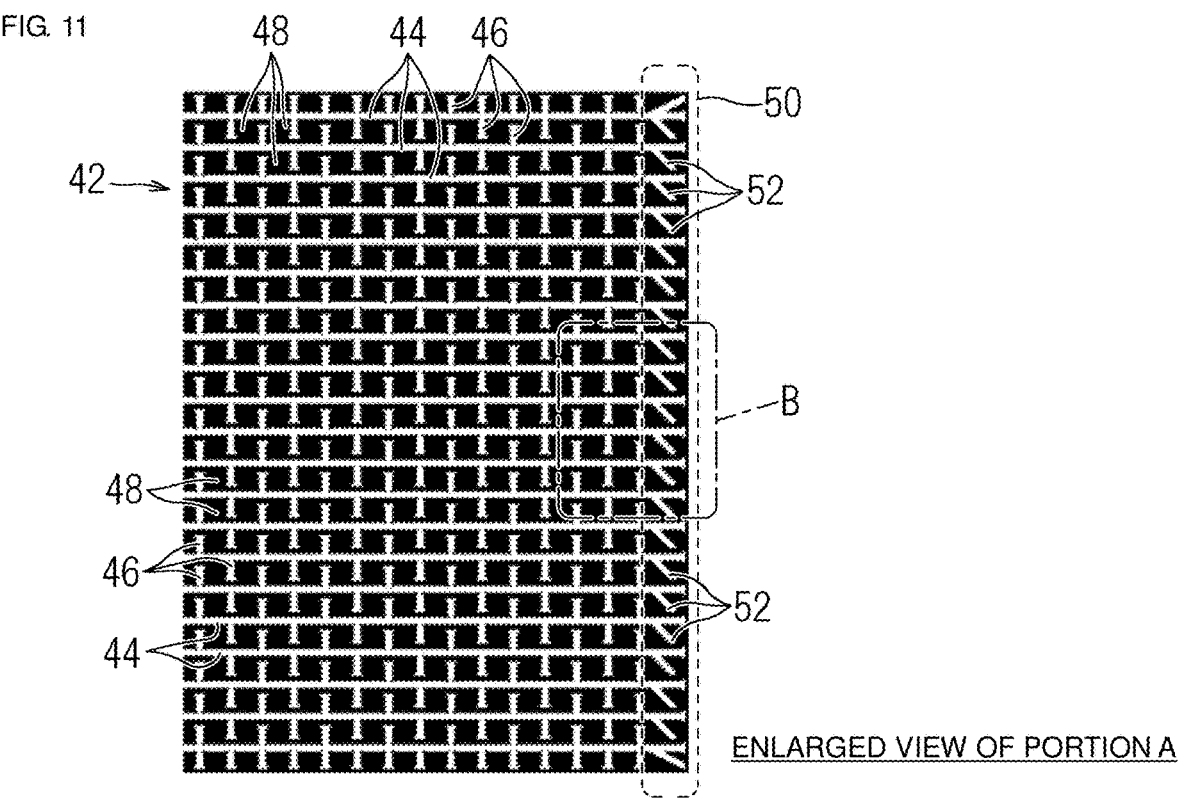
FIG. 11 is a diagram showing a portion A of the printing portion shown in FIG. 10 in an enlarged view.
Figure 12:
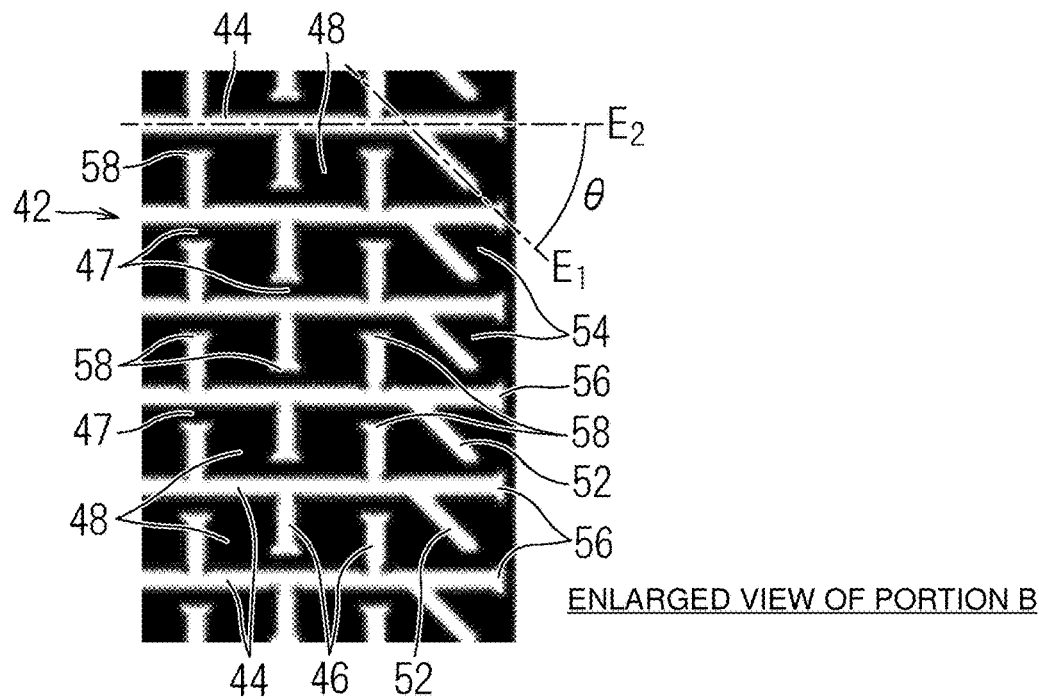
FIG. 12 is a diagram showing a portion B of the printing portion shown in FIG. 11 in a further enlarged view.

FIG. 7 is a diagram showing the gravure printing machine including the printing plate for gravure printing according to the first preferred embodiment of the present invention. FIG. 8 is a cross-sectional view showing a state in which a conductive paste film is provided on a ceramic green sheet backed by a carrier film as a printing target portion by the gravure printing machine shown in FIG. 7. FIG. 9 is a perspective view showing the printing plate for gravure printing shown in FIG. 7 alone. FIG. 10 is an expanded view of an outer circumferential surface of the printing plate for gravure printing, showing one printing portion provided on the printing plate for gravure printing shown in FIG. 9 in an enlarged view. FIG. 11 is a diagram showing a portion A of the printing portion shown in FIG. 10 in an enlarged view. FIG. 12 is a diagram showing a portion B of the printing portion shown in FIG. 11 in a further enlarged view.

The gravure printing machine 30 includes the printing plate for gravure printing (hereinafter, simply referred to as a printing plate) 40A1, and an impression cylinder 32 opposing the printing plate 40A1 with a printing object 60 with a sheet or substantially sheet shape pinched therebetween. The printing plate 40A1 and the impression cylinder 32 rotate in rotation directions indicated by arrows $R_1$ and $R_2$, respectively, so that the printing object 60 is transported in a transport direction indicated by an arrow F. Note that as in a case of a gravure printing lithographic printing machine, a gravure printing machine which does not include the impression cylinder may also be implemented.

The gravure printing machine 30 is used, for example, to manufacture a multilayer ceramic electronic component such as the multilayer ceramic capacitor as described above. More particularly, the gravure printing machine 30 is used to form a paste film, which is to be a patterned layer defining a portion of a lamination structure included in the multilayer ceramic capacitor 10A, on the printing object 60 by gravure printing. More specifically, as shown in FIG. 8, a conductive paste film 64 to be a patterned inner electrode is formed on a ceramic green sheet 62 by gravure printing.

As shown in FIG. 8, the ceramic green sheet 62 is in a state of being backed by a carrier film 66. Accordingly, the printing object 60 shown in FIG. 8 is the ceramic green sheet 62 backed by the carrier film 66.

(2) Printing Plate for Gravure Printing

The printing plate 40A1 is a member that applies a printing paste on a surface of the printing object 60 to form a predetermined graphic pattern by the above-described gravure printing method. The printing plate 40A1 includes a gravure roll 40a with a cylindrical or substantially cylindrical shape, and a plurality of printing portions 42 corresponding to a graphic pattern to be printed is provided on an outer circumferential surface 40b of the gravure roll 40a.

The plurality of printing portions 42 is provided in a matrix or substantially matrix shape along the rotation direction $R_1$ and an axial center direction C of the printing plate 40A1. Additionally, as shown in FIG. 7, the printing plate 40A1 is immersed in a conductive paste 36 for an inner electrode which is a printing paste stored in a tank 34, and thus the conductive paste 36 is applied to the plurality of printing portions 42 (a portion thereof is shown) provided on the outer circumferential surface 40b of the printing plate 40A1. Details of the printing portion 42 will be described below. Note that the conductive paste 36 may be supplied to the printing plate 40A1 by a method, such as injecting the conductive paste 36 toward the printing plate 40A1, for example. Extra conductive paste 36 on an outer surface of the printing plate 40A1 is wiped off by a doctor blade 38.

The printing portion 42 includes a pattern corresponding to the pattern of the conductive paste film 64 shown in FIG. 8, as only a representative example of the portion is shown in FIG. 10. In the first preferred embodiment, a lengthwise direction of the printing portion 42 follows a circumferential direction of the printing plate 40A1.

The printing direction shown in FIG. 10 corresponds to the rotation direction $R_1$ shown in FIG. 7. More specifically, of the printing portion 42 in FIG. 10, a right end side is a print starting end side, and a left end side is a print terminating end side. Accordingly, in a printing process by the gravure printing machine 30, a position of an area of the printing portion 42 in contact with the printing object 60 changes from the right end side to the left end side in FIG. 10.

The printing portion 42 includes a plurality of first banks 44 extending in a parallel or substantially parallel direction to the rotation direction $R_1$ which is a circumferential direction of the printing plate 40A1, a plurality of second banks 46 extending in a direction orthogonal or substantially orthogonal to the rotation direction $R_1$ and in each of which any one of end portions is connected to the first bank 44, and a plurality of cells 48 defined by the first banks 44 and the second banks 46. A shape of the printing portion 42 is not particularly limited, and a rectangular or substantially rectangular shape or a substantially rectangular shape in which a narrow width portion or a wide width portion is partially provided may be included. In the first preferred embodiment, the substantially rectangular shape will be described. Note that with respect to the shape of the printing portion 42, a preferred embodiment of the present invention in which the narrow width portion or the wide width portion is partially provided in the substantially rectangular shape will be described below.

(a) First Bank

The first bank 44 extends in the parallel or substantially parallel direction to the rotation direction $R_1$ which is the circumferential direction of the printing plate 40A1, and is located in the printing portion 42. The plurality of first banks 44 are provided with intervals therebetween. A width, along a direction orthogonal or substantially orthogonal to the printing direction, of each end portion of the first bank 44 in the printing direction (rotation direction $R_1$) is preferably larger than a width, along the direction orthogonal or substantially orthogonal to the printing direction, of the other portion of the first bank 44. In other words, at each of the end portions of the first bank 44 in the printing direction (rotation direction $R_1$), a first projection portion 56 is preferably larger than the width, along the direction orthogonal or substantially orthogonal to the printing direction, of the portion other than both the end portions of the first bank 44. Accordingly, an area of the bank at a leading end is able to be increased, the paste is easier to be transferred even at the leading end portion, and thus an effect of further significantly reducing or preventing print blur from occurring is able to be provided. The interval between the plurality of adjacent first banks 44 is able to be appropriately set in accordance with the graphic pattern to be printed. Note that by decreasing the interval between the adjacent first banks 44 when applying with a thin application thickness, and by increasing the interval therebetween when applying with a thick application thickness, the application thickness is able to be adjusted.

(b) Second Bank

The second bank 46 extends in the direction orthogonal or substantially orthogonal to the rotation direction $R_1$, and, in the printing portion 42, any one of end portions is connected to the first bank 44. The plurality of second banks 46 is provided with intervals therebetween. The one end portions of the second banks 46 are preferably connected to the first banks 44 in a staggered arrangement. Furthermore, in the second bank 46, the other end portion of the second bank 46 on a side which is not connected to the first bank 44 is not connected to another first bank 44 which opposes (is adjacent to) the first bank 44 to which the one end portion is connected. In other words, a gap portion 47 is provided between the other end portion of each of the second banks 46 and the first bank 44. Accordingly, the conductive paste 36 is able to flow while filling each of the cells 48 sandwiched between the first banks 44, and a transfer amount from each of the cells 48 is able to be kept constant or substantially constant. As a result, the occurrence of the print blur is able to be significantly reduced or prevented. Note that by decreasing not only the interval between the first banks 44 but also the interval between the adjacent second banks 46 when applying with a thin application thickness, and by increasing the intervals therebetween when applying with a thick application thickness, it becomes easier to adjust the application thickness. Note that the application thickness is able to be adjusted only by adjusting the interval between the adjacent second banks 46.

Note that the staggered arrangement indicates a shape in which, in FIG. 11 to FIG. 14 and the like, when the second banks 46 are connected to the first banks 44, the second banks 46 extend in mutually opposite directions in the direction orthogonal or substantially orthogonal to the first bank 44, and the second banks are alternately provided when viewed along the printing direction.

A width, along the parallel or substantially parallel direction to the printing direction, of the other end portion of the second bank 46 on the side which is not connected to the first bank 44 is preferably larger than a width, along the parallel or substantially parallel direction to the printing direction, of the other portion of the second bank 46. In other words, at the other end portion of the second bank 46 on the side which is not connected to the first bank 44, a second projection portion 58 is preferably larger than the width, along the parallel or substantially parallel direction to the printing direction, of the portion other than the other end portion of the second bank 46. Accordingly, an area of the bank at a leading end is able to be increased, the conductive paste 36 is easier to be transferred even at the leading end portion, and thus an effect of further significantly reducing or preventing the print blur from occurring is able to be provided.

Note that the interval between the plurality of adjacent second banks 46 is able to be appropriately set in accordance with the graphic pattern to be printed.

(c) Cell

In the printing portion 42, the cells 48 defined by the first banks 44 and the second banks 46 are provided. However, the cells 48 are not completely partitioned off by the first banks 44 and the second banks 46. Specifically, as described above, the one end portions of the second banks 46 are preferably connected to the first banks 44 in the staggered arrangement, and the other end portion of each of the second banks 46 on the side which is not connected to the first bank 44 is not connected to the other first bank 44 which opposes (is adjacent to) the first bank 44 to which the one end portion is connected. In other words, as described above, the gap portion 47 is provided between the other end portion of each of the second banks 46 and the first bank 44. Therefore, the cells 48 are continuously provided along the rotation direction $R_1$ of the printing portion 42 without interruption.

Accordingly, the conductive paste 36 is able to flow while filling each of the cells 48 sandwiched between the first banks 44, and an effect that the transfer amount from each of the cells 48 is kept constant or substantially constant is able to be provided. As a result, the occurrence of the print blur is able to be significantly reduced or prevented.

The cell 48 is lower in height than the first bank 44, the second bank 46, and a printing surface of the printing plate 40A1 other than the printing portion 42. In other words, the cell 48 has a substantially recessed shape.

(d) Partition Bank

In the printing portion 42, in the rotation direction $R_1$, a print starting end portion 50 of the printing portion 42 is included at a region which is located at a portion which first comes into contact with the printing object 60, that is, on the print starting end side of the printing portion 42. In the cell 48 located at the print starting end portion 50, a partition bank 52 which divides the cell 48 in a diagonal direction is provided. Accordingly, since a contact area of the partition bank 52, which is a transfer trigger, with respect to the ceramic green sheet 62 is able to be provided while also providing an opening area of the cell 48, printing is able to be performed without the print blur.

Specifically, the print starting end portion 50 is a portion of the cell 48 of a first row which first comes into contact with the printing object 60 in the printing portion 42. An end portion side of the print starting end portion 50 (the side first comes into contact with the printing object 60, that is, the print starting end side) is opened without providing the second bank 46, and an open portion 54 is provided.

In the partition bank 52, one end portion is connected to the first bank 44, and the other end portion on the side which is not connected to the first bank 44 is not connected to another first bank 44 which opposes (is adjacent to) the first bank 44 to which the one end portion is connected. Accordingly, the conductive paste 36 is able to flow while filling each of the cells 48 divided by the partition bank 52. As a result, the occurrence of the print blur is able to be significantly reduced or prevented.

An angle θ of an acute angle defined by a center line $E_1$ of the partition bank 52 along a direction in which the partition bank 52 extends and a center line $E_2$ of the first bank 44 along the direction in which the first bank 44 extends intersecting with each other is preferably equal to or larger than approximately 15° and equal to or smaller than approximately 75°, for example. When the angle is smaller than approximately 15°, since a cell between the second bank 46 and the partition bank 52 becomes larger, and a distance to the partition bank 52 of the transfer trigger increases, the print blur due to a lack of the transfer trigger between the second bank 46 and the partition bank 52 is not able to be reduced or prevented in some cases. On the other hand, when the angle is larger than approximately 75°, since a distance between the open portion 54 of the print starting end portion 50 and the partition bank 52 increases, the cell 48 between the open portion 54 of the print starting end portion 50 and the partition bank 52 becomes larger, and a distance to the bank of the transfer trigger increases, the print blur due to a lack of the transfer trigger between the open portion 54 of the print starting end portion 50 and the partition bank 52 are not able to be reduced or prevented in some cases.

3. Method of Manufacturing Multilayer Ceramic Electronic Component

Next, a method of manufacturing a multilayer ceramic electronic component will be described with respect to a method of manufacturing the multilayer ceramic capacitor 10A according to the first preferred embodiment of the present invention as an example.

First, a ceramic green sheet and a conductive paste of an inner electrode are prepared. Although a binder and a solvent are included in the ceramic green sheet and the conductive paste of the inner electrode, an organic binder and an organic solvent that are known are able to be included.

Next, the conductive paste of the inner electrode is applied on the ceramic green sheet using the gravure printing machine 30 in a predetermined pattern using the printing plate 40A1 for gravure printing according to a preferred embodiment of the present invention, an inner electrode pattern is formed, and a ceramic green sheet on which the inner electrode pattern is provided is prepared. Additionally, a ceramic green sheet on which the inner electrode pattern is not formed is also prepared.

Subsequently, the predetermined number of ceramic green sheets for the outer layer on each of which the inner electrode pattern is not provided are laminated, the ceramic green sheets on each of which the inner electrode pattern is provided are sequentially laminated thereon, and the predetermined number of ceramic green sheets on each of which the inner electrode pattern is not formed are further laminated, and thus a multilayer body sheet is manufactured.

Next, the multilayer body sheet is preferably subjected to pressure bonding in the lamination direction (height direction) by a method such as an isostatic press, for example, and a multilayer block is manufactured.

Thereafter, the multilayer body block is cut into a predetermined shape and size, and a raw multilayer body chip is cut out. At this time, barrel polishing or the like may be performed on the raw multilayer body chip, and corner portions and ridge line portions of the multilayer body chip may be substantially rounded.

Subsequently, the cut-out raw multilayer body chip is fired, a multilayer body is produced in which the first inner electrode layer and the second inner electrode layer are provided inside the multilayer body, the first inner electrode layer is extended to the first end surface, and the second inner electrode layer is extended to the second end surface. Note that the firing temperature of the raw multilayer body chip depends on the ceramic material and the material of the conductive paste of the inner electrode, but is preferably equal to or higher than approximately 900° C. and equal to or lower than approximately 1300° C., for example.

In order to form the baked layer of the outer electrode 24, for example, to the exposed portion of the first extended electrode portion 20a of the first inner electrode layer 16a exposed on the surface of the multilayer body 12 from the first end surface 12e, an outer electrode conductive paste including a glass component and a metal is applied according to a method such as, for example, dipping or the like and baked, the first base electrode layer is formed. Additionally, similarly, in order to form the baked layer of the outer electrode 24, for example, to the exposed portion of the second extended electrode portion 20b of the second inner electrode layer 16b exposed from the second end surface 12f of the multilayer body 12, the outer electrode conductive paste including the glass component and the metal is applied according to the method such as, for example, dipping or the like and baked, the second base electrode layer is formed. The temperature of the baking process is preferably equal to or higher than approximately 700° C. and equal to or lower than approximately 900° C., for example.

Note that in a case where the base electrode layer is formed of the conductive resin layer, the conductive resin layer is able to be formed according to the following method. Note that the conductive resin layer may be formed on the surface of the baked layer, or the conductive resin layer alone may be directly formed on the surface of the multilayer body 12 without forming the baked layer.

In a method of forming the conductive resin layer, a conductive resin paste including a thermosetting resin and a metal component is applied to the surface of the baked layer or the multilayer body 12, heat treatment is performed at a temperature of equal to or higher than approximately 250° C. and equal to or lower than approximately 550° C., for example, the resin is thermally cured, and the conductive resin layer is formed. In this case, an atmosphere at the time of the heat treatment is preferably an $N_2$ atmosphere, for example. In addition, in order to prevent the resin from scattering and to prevent various metal components from oxidizing, an oxygen concentration is preferably equal to or less than approximately 100 ppm, for example.

In addition, in a case where the base electrode layer is formed of the thin film layer, the base electrode layer is able to be formed according to a thin film formation method such as a sputtering method or a vapor deposition method, for example. The base electrode layer formed of the thin film layer is a layer with a thickness of equal to or less than approximately 1 μm, for example, formed by metal particles being deposited.

Furthermore, the plating layer may be provided on the exposed portion of the inner electrode layer 16 of the multilayer body 12 without providing the base electrode layer. In this case, the plating layer is formed according to the following method.

A plating process is performed on the first end surface 12e and the second end surface 12f of the multilayer body 12, and a base plating electrode is formed on the exposed portion of the inner electrode layer 16. When performing the plating process, any of electrolytic plating and electroless plating may be implemented, but the electroless plating preferably includes a pretreatment with a catalyst or the like to increase a plating deposition rate, resulting in a disadvantage in that the process is complicated. Therefore, normally, the electrolytic plating is preferably implemented. As a plating method, barrel plating is preferably used. Furthermore, an upper layer plating electrode may be similarly formed on the surface of the lower layer plating electrode.

Thereafter, the plating layer is formed on the surface of the base electrode layer, the surface of the conductive resin layer or the surface of the base plating layer, or the surface of the upper layer plating layer, and the outer electrode 24 is formed. In the multilayer ceramic capacitor 10A shown in FIG. 1, an Ni plating layer and an Sn plating layer are formed as a plating layer on the baked layer. The Ni plating layer and the Sn plating layer are sequentially formed according to, for example, the barrel plating method.

As described above, the multilayer ceramic capacitor 10A shown in FIG. 1 is manufactured.

According to the printing plate 40A1 for gravure printing provided with the printing portion 42 shown in FIG. 10, the plurality of cells 48 of the printing portion 42 are not completely partitioned off by the second banks 46, and each includes the gap portion 47 between the other end portion of each of the second banks 46 and the first bank 44. Therefore, the paste easily flows into each of the cells 48, and each of the plurality of cells 48 is able to be sufficiently filled with the conductive paste 36. As a result, the transfer amount from each of the cells 48 is able to be constant or substantially constant, and thus the print blur is able to be significantly reduced or prevented.

Furthermore, according to the printing plate 40A1 for gravure printing provided with the printing portion 42 shown in FIG. 10, in the cell 48 which is located at the print starting end portion 50 of the printing portion 42 which first comes into contact with the printing object 60, since the partition bank 52 which divides the cell 48 in the diagonal direction is provided, in a print starting portion in which the print blur generally easily occur, while providing the opening area, the contact area of the partition bank 52 which is the transfer trigger with respect to the ceramic green sheet 62 is able to be provided.

As a result, according to the printing plate 40A1 for gravure printing provided with the printing portion 42 shown in FIG. 10, the print blur is able to be significantly reduced or prevented while providing the fluidity of the conductive paste 36.

First Modification of First Preferred Embodiment

Next, a printing plate 40A2 for gravure printing according to a first modification of the first preferred embodiment of the present invention will be described.

Figure 13:
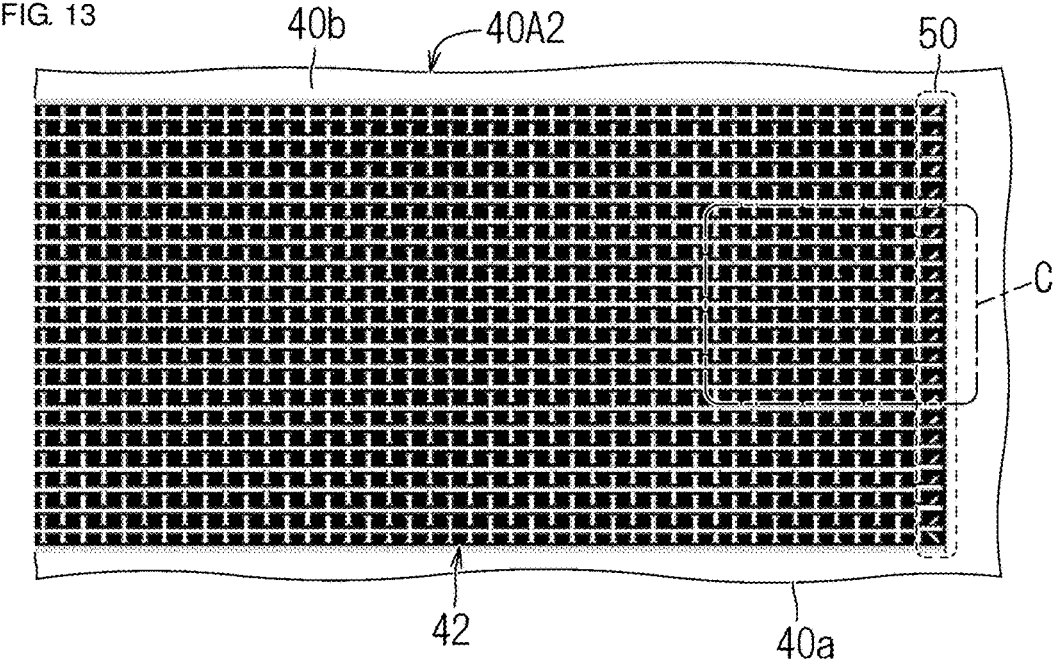
FIG. 13 is a diagram, which corresponds to FIG. 10, showing a portion of a printing portion according to a first modification of the first preferred embodiment of the present invention in an enlarged view.
Figure 14:
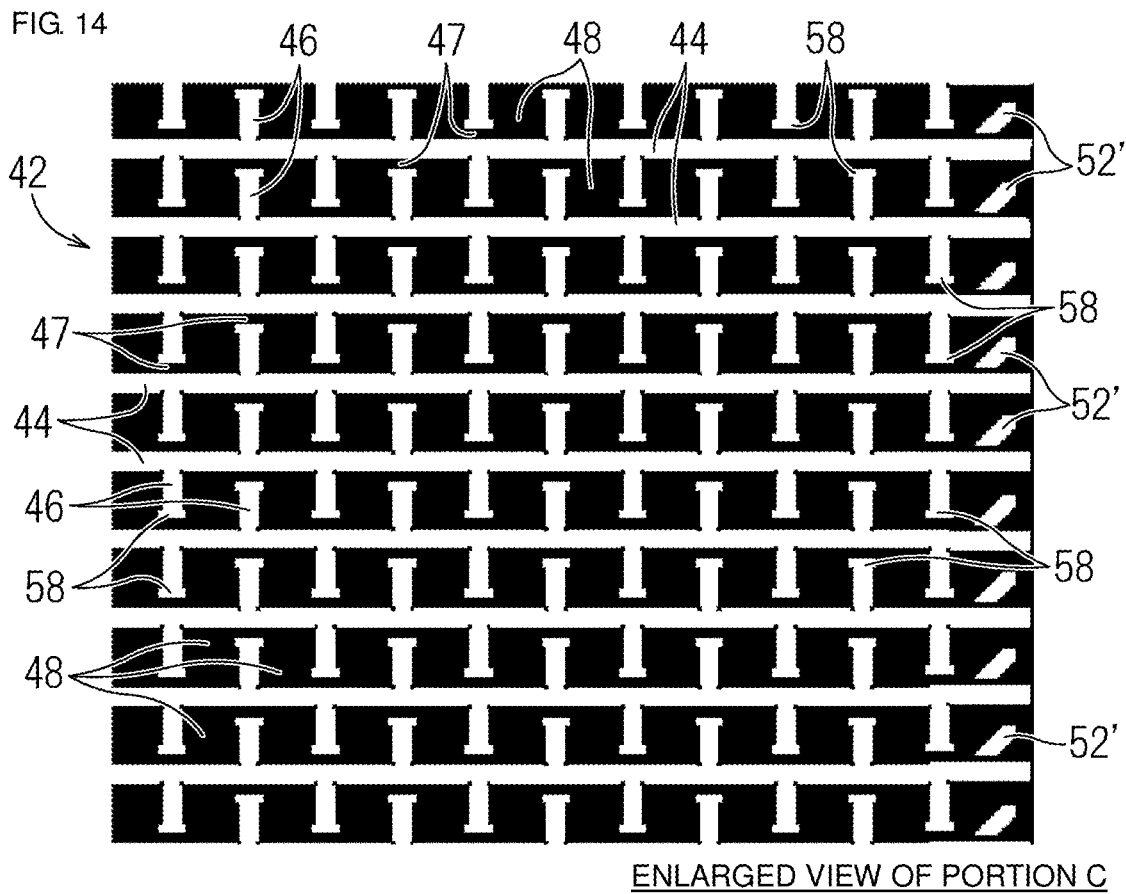
FIG. 14 is a diagram showing a portion C of the printing portion shown in FIG. 13 in an enlarged view.

FIG. 13 is a diagram, which corresponds to FIG. 10, showing a printing portion according to the first modification of the first preferred embodiment of the present invention. FIG. 14 is a diagram showing a portion C of the printing portion shown in FIG. 13 in an enlarged view.

Note that in the printing plate 40A2 for gravure printing according to the first preferred embodiment, except that a shape of a partition bank 52' located at the print starting end portion 50 is different, the other shape is the same or substantially the same as that of the printing plate 40A1, and therefore description thereof will be omitted.

As shown in FIG. 13 and FIG. 14, in the partition bank 52' located at the print starting end portion 50, neither one end portion nor the other end portion of the partition bank 52' is connected to the first bank 44. Accordingly, the fluidity of the conductive paste even in the cell 48 located at the print starting end portion 50 is able to be further improved.

Note that in the printing plate 40A2, the first projection portions 56 may not be provided or may be provided on both end portions of the first bank 44.

Second Modification of First Preferred Embodiment

Next, a printing plate 40A3 for gravure printing according to a second modification of the first preferred embodiment of the present invention will be described.

Note that in the printing plate 40A3 for gravure printing according to the first preferred embodiment, except that a narrow width portion 70 is provided in the printing portion 42, the other shape is the same or substantially the same as that of the printing plate 40A1, and therefore description thereof will be omitted.

Prior thereto, an inner electrode pattern of the multilayer ceramic capacitor 10A formed by the printing plate 40A3 for gravure printing will be described.

Figure 15:
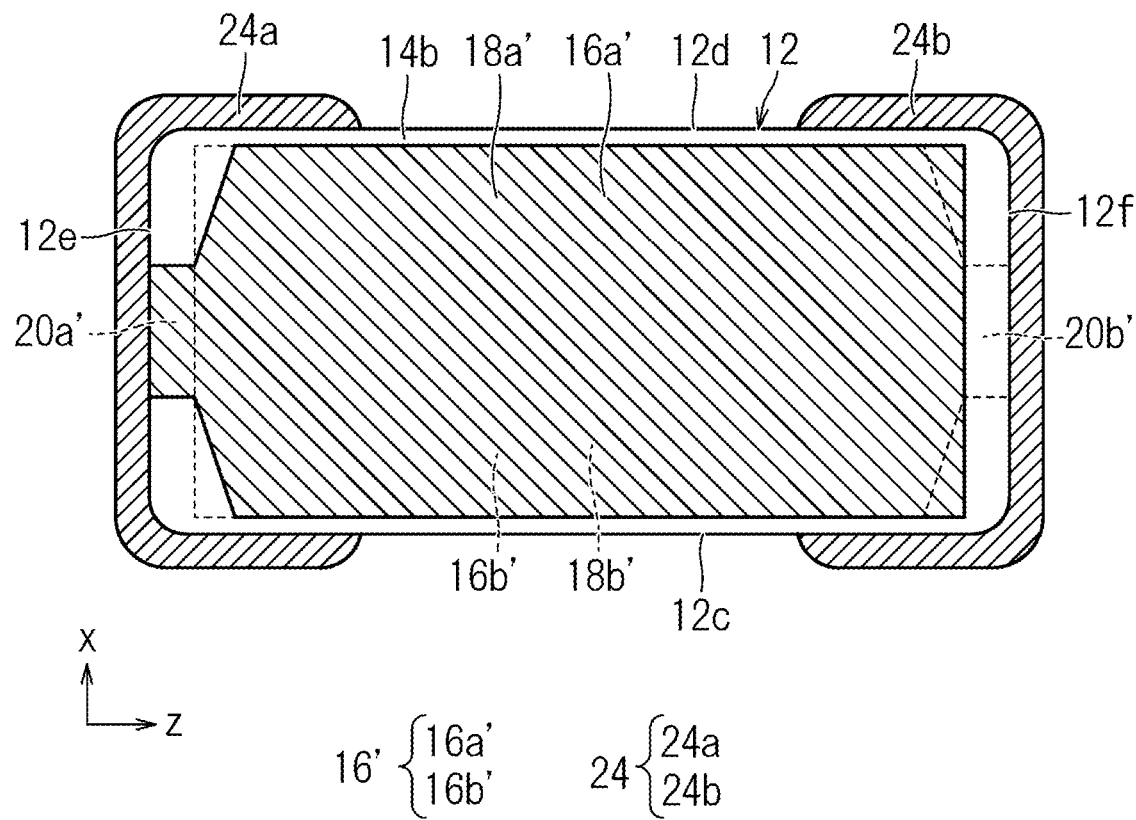
FIG. 15 is a diagram showing a shape of an inner electrode layer different from the inner electrode layer according to the first preferred embodiment of the present invention.

FIG. 15 shows a shape of an inner electrode layer 16' which is different from those of the first inner electrode layer 16a shown in FIG. 4 and the second inner electrode layer 16b shown in FIG. 5 according to the first preferred embodiment of the present invention. The inner electrode layer 16' shown in FIG. 15 includes a first inner electrode layer 16a' and a second inner electrode layer 16b'.

As shown in FIG. 15, the first inner electrode layer 16a' includes a first opposite electrode portion 18a' opposing the second inner electrode layer 16b', and a first extended electrode portion 20a' extended from the first opposite electrode portion 18a' to the first end surface 12e of the multilayer body 12.

Specifically, the first extended electrode portion 20a' is exposed on the first end surface 12e of the multilayer body 12. Accordingly, the first inner electrode layer 16a' is not exposed on the second end surface 12f, the first side surface 12c, and the second side surface 12d of the multilayer body 12. In addition, a size of the first extended electrode portion 20a' of the first inner electrode layer 16a' in the width direction y is smaller than a size of the first opposite electrode portion 18a' of the first inner electrode layer 16a' in the width direction y.

Furthermore, as shown in FIG. 15, the second inner electrode layer 16b' includes a second opposite electrode portion 18b' opposing the first inner electrode layer 16a', and a second extended electrode portion 20b' extended from the second opposite electrode portion 18b' to the second end surface 12f of the multilayer body 12.

Specifically, the second extended electrode portion 20b' is exposed on the second end surface 12f of the multilayer body 12. Accordingly, the second inner electrode layer 16b' is not exposed on the first end surface 12e, the first side surface 12c, and the second side surface 12d of the multilayer body 12. In addition, a size of the second extended electrode portion 20b' of the second inner electrode layer 16b' in the width direction y is smaller than a size of the second opposite electrode portion 18b' of the second inner electrode layer 16b' in the width direction y.

Next, the printing plate 40A3 for gravure printing according to the second modification of the first preferred embodiment of the present invention will be described.

Figure 16:
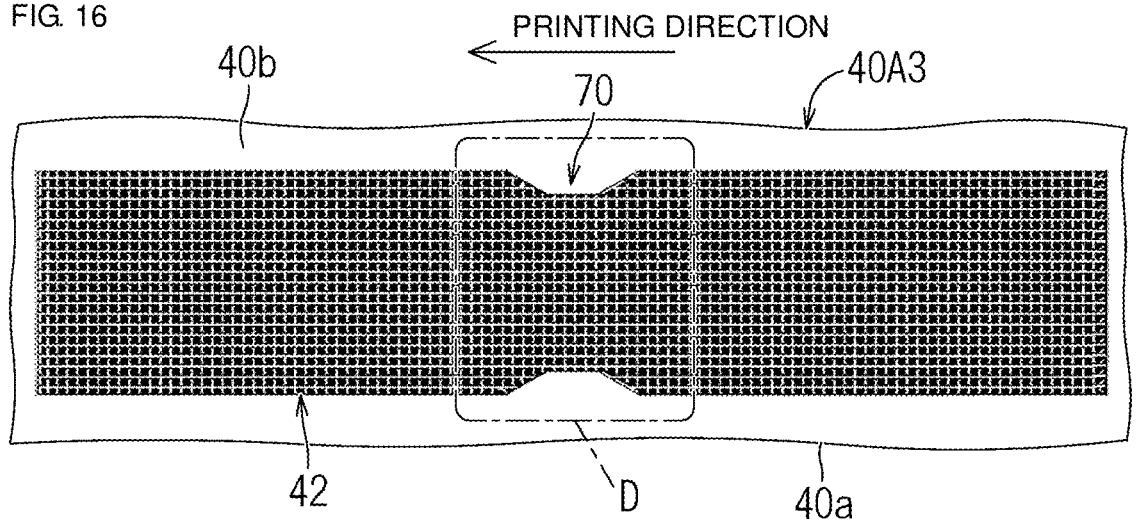
FIG. 16 is a diagram, which corresponds to FIG. 10, showing a printing portion according to a second modification of the first preferred embodiment of the present invention.
Figure 17:
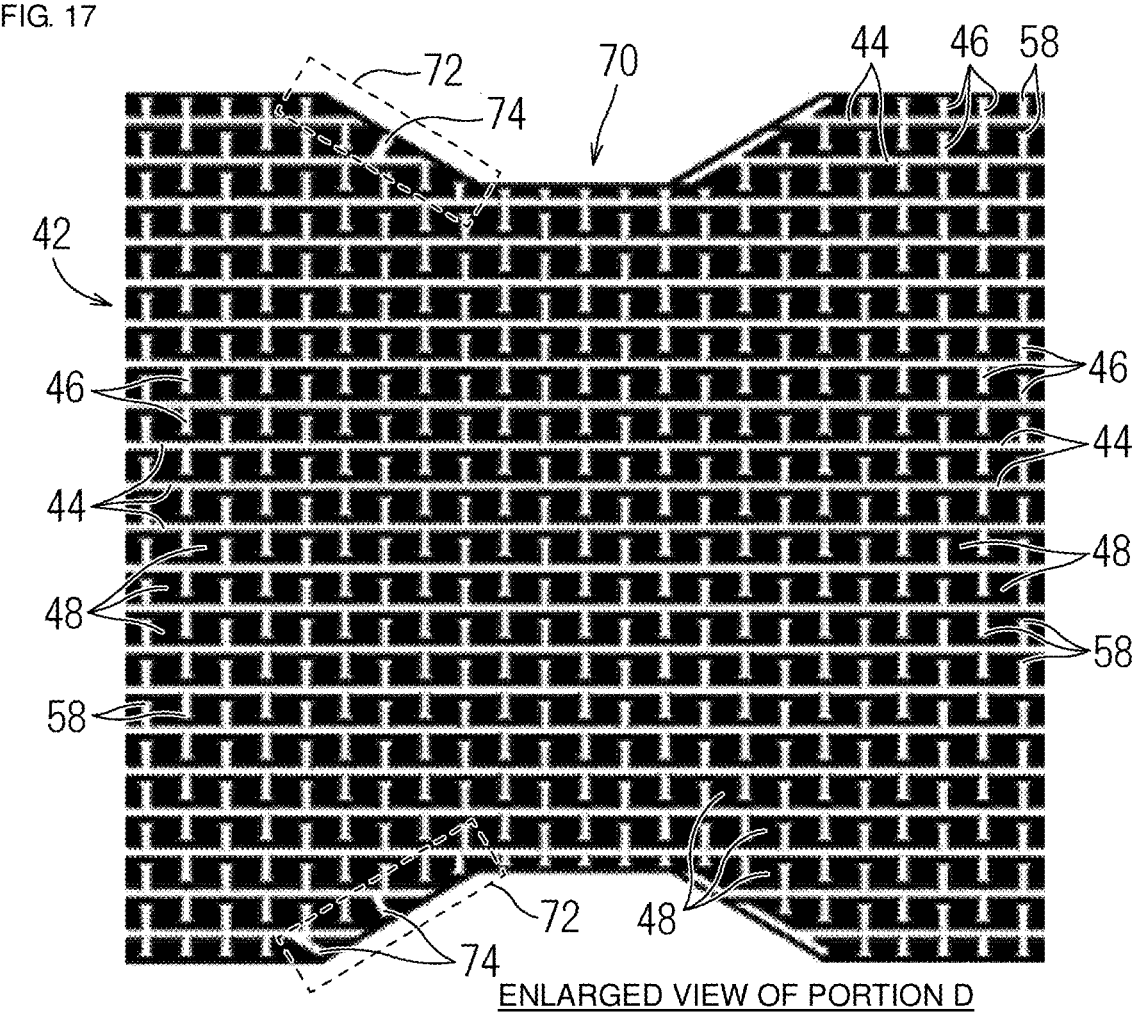
FIG. 17 is a diagram showing a portion D of the printing portion shown in FIG. 16 in an enlarged view.

FIG. 16 is a diagram, which corresponds to FIG. 10, showing a printing portion according to the second modification of the first preferred embodiment of the present invention. FIG. 17 is a diagram showing a portion D of the printing portion shown in FIG. 16 in an enlarged view.

When manufacturing the multilayer ceramic capacitor 10A including the inner electrode layer 16' with the shape as shown in FIG. 15, the printing plate 40A3 as shown in FIG. 16 is included as the printing plate.

The printing portion 42 provided on the printing plate 40A3 is provided with the narrow width portion 70 in which a width of the printing portion 42 decreases in a direction orthogonal or substantially orthogonal to the rotation direction of the printing plate 40A3 (axial center direction). Furthermore, the printing portion 42 of the narrow width portion 70 includes a print starting end portion 72 which first comes into contact with the printing object 60. In the cell 48 located at the print starting end portion 72 on an outline of the narrow width portion 70, a second partition bank 74 which divides the cell obliquely intersects with the printing direction is provided.

Accordingly, even when an inner electrode pattern provided with the narrow width portion 70 is printed, in the cell 48 located at the print starting end portion 72 of the printing portion 42 of the narrow width portion 70 which first comes into contact with the printing object 60 again by providing the narrow width portion 70, by arranging the second partition bank 74 which divides the cell in the diagonal direction, while providing the opening area, the ceramic green sheet of the partition bank which is the transfer trigger is able to be kept constant or substantially constant, and the print blur is able to be significantly reduced or prevented.

Second Preferred Embodiment

1. Multilayer Ceramic Capacitor

Next, a multilayer ceramic capacitor (three-terminal type multilayer ceramic capacitor) manufactured by a gravure printing machine using a printing plate for gravure printing according to a second preferred embodiment of the present invention will be described.

Figure 18:
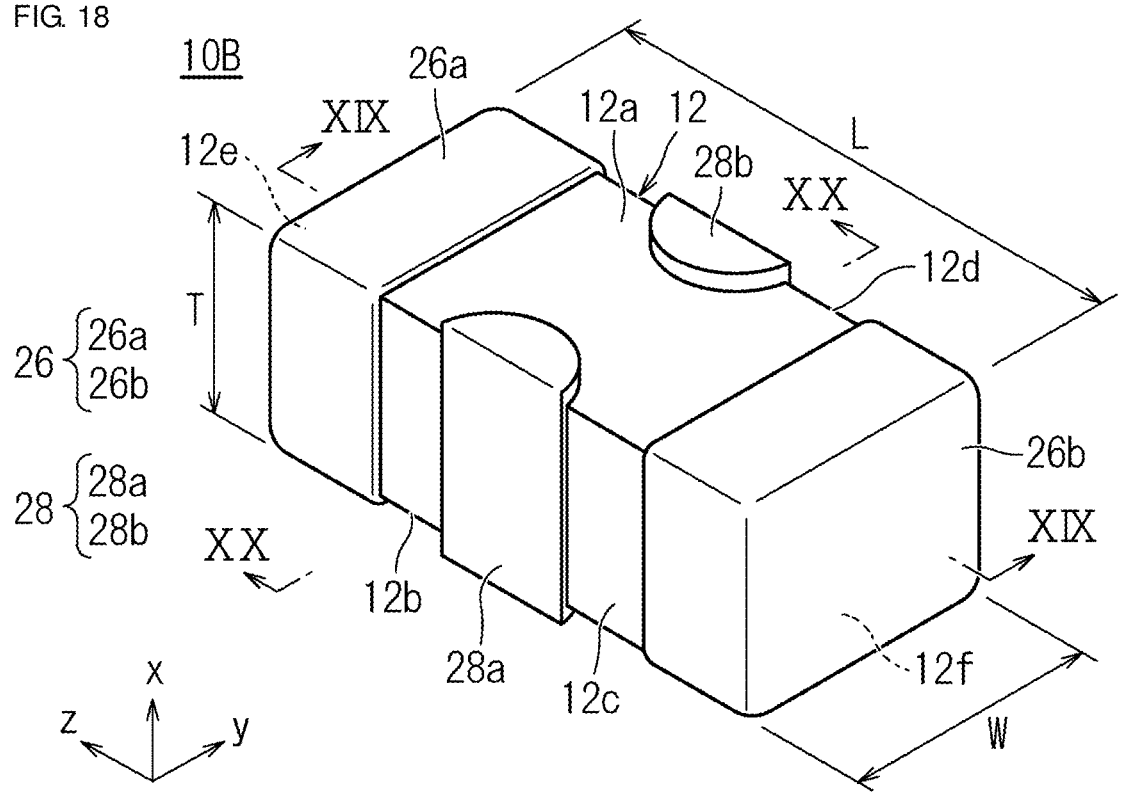
FIG. 18 is an external perspective view showing an example of a multilayer ceramic capacitor (three-terminal type multilayer ceramic capacitor) manufactured using a printing plate for gravure printing according to a second preferred embodiment of the present invention.
Figure 19:
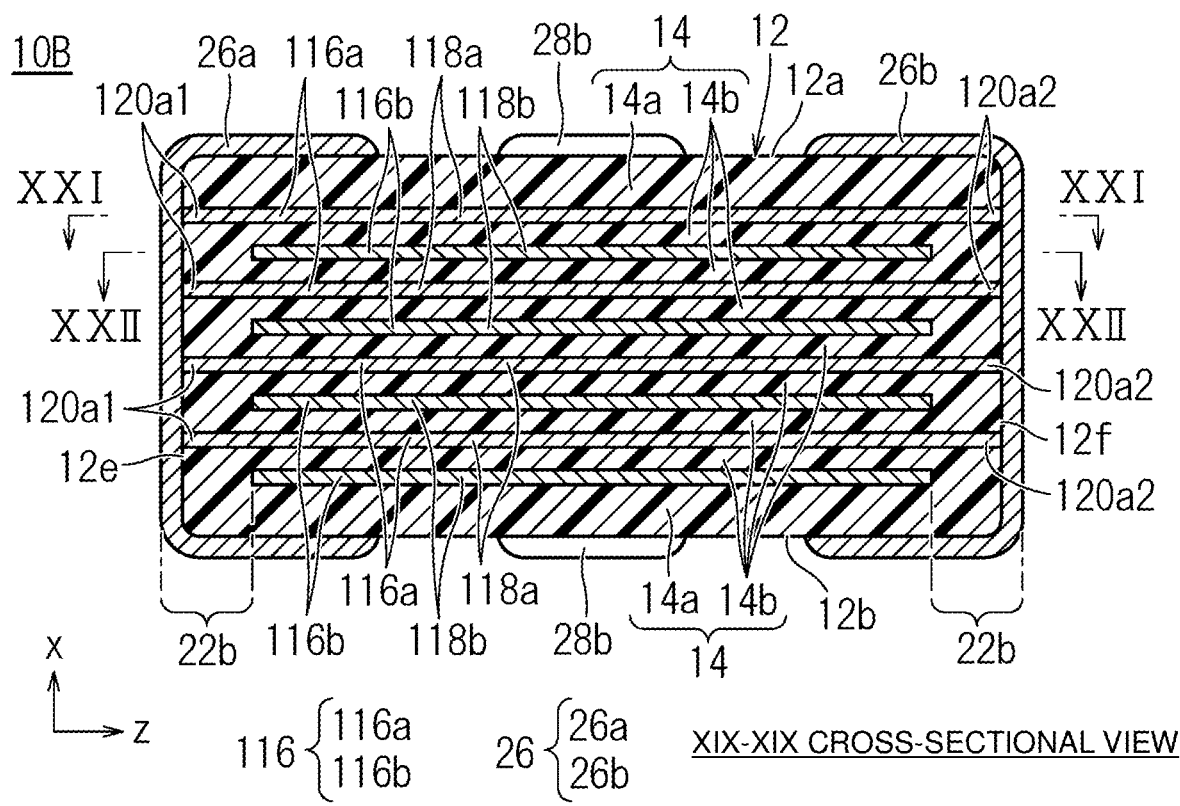
FIG. 19 is a cross-sectional view taken along a line XIX-XIX in FIG. 18.
Figure 20:
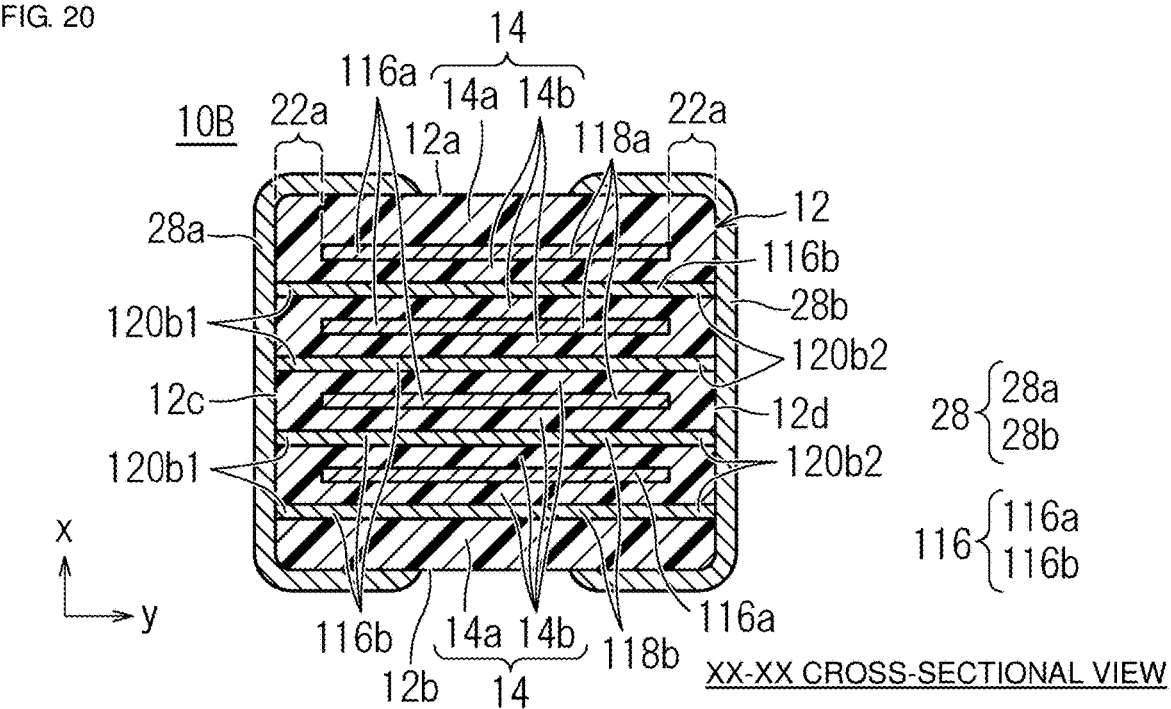
FIG. 20 is a cross-sectional view taken along a line XX-XX in FIG. 18.
Figure 21:
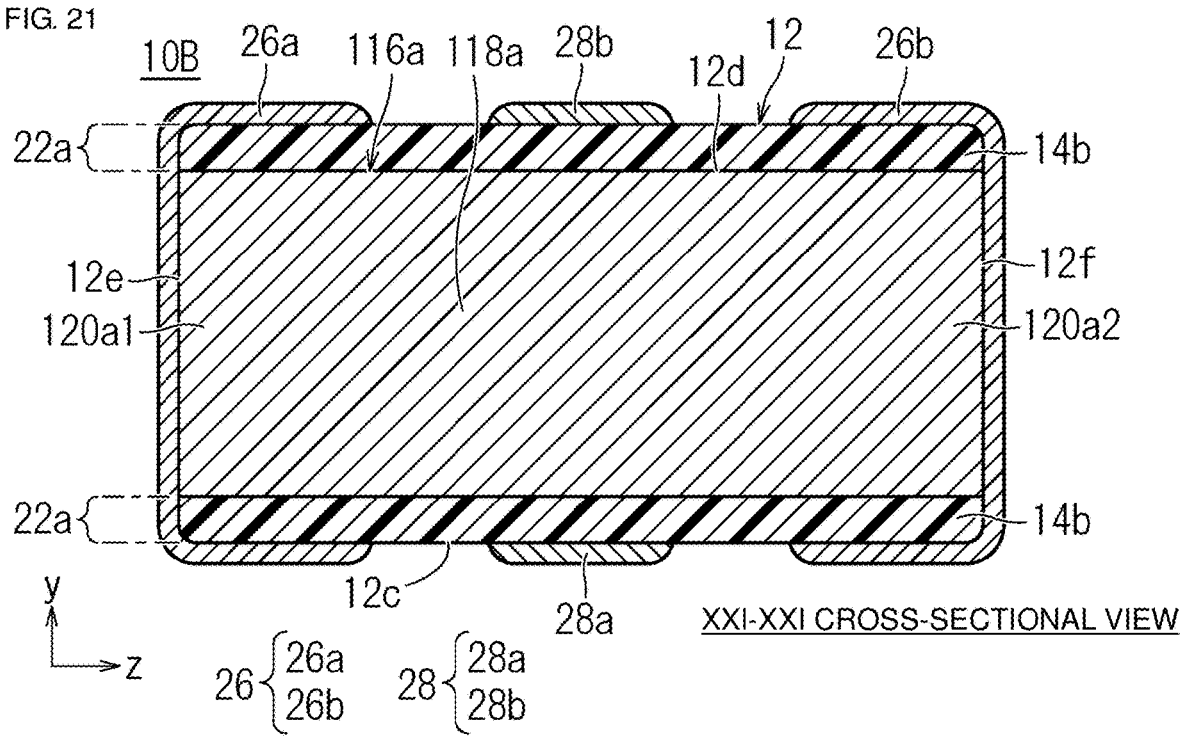
FIG. 21 is a cross-sectional view taken along a line XXI-XXI in FIG. 19.

FIG. 18 is an external perspective view showing an example of the multilayer ceramic capacitor (three-terminal type multilayer ceramic capacitor) manufactured using the printing plate for gravure printing according to the second preferred embodiment of the present invention. FIG. 19 is a cross-sectional view taken along a line XIX-XIX in FIG. 18. FIG. 20 is a cross-sectional view taken along a line XX-XX in FIG. 18. FIG. 21 is a cross-sectional view taken along a line XXI-XXI in FIG. 19. FIG. 22 is a cross-sectional view taken along a line XXII-XXII in FIG. 19.

As shown in FIG. 18 to FIG. 20, a multilayer ceramic capacitor 10B includes, for example, the multilayer body 12 with a rectangular or substantially rectangular parallelepiped shape.

The multilayer body 12 includes the plurality of ceramic layers 14 and a plurality of inner electrode layers 116 which are laminated. Furthermore, the multilayer body 12 includes the first main surface 12a and the second main surface 12b facing each other in the lamination direction x, the first side surface 12c and the second side surface 12d facing each other in the width direction y which is orthogonal or substantially orthogonal to the lamination direction x, and the first end surface 12e and the second end surface 12f facing each other in the length direction z which is orthogonal or substantially orthogonal to the lamination direction x and the width direction y. The multilayer body 12 includes corner portions and ridge line portions which are substantially rounded. Note that the corner portion refers to a portion where three adjacent surfaces of the multilayer body intersect with one another, and the ridge line portion refers to a portion where two adjacent surfaces of the multilayer body intersect with each other. In addition, unevenness or the like may be provided on a portion of or all of the first main surface 12a and the second main surface 12b, the first side surface 12c and the second side surface 12d, and the first end surface 12e and the second end surface 12f. Furthermore, in the multilayer body 12, the dimension in the length direction z is not necessarily longer than the dimension in the width direction y.

The multilayer body 12 includes the outer layer portion 14a including the plurality of ceramic layers 14, and the inner layer portion 14b includes the single layer or the plurality layers of the ceramic layers 14 and the plurality of inner electrode layers 116 provided thereon. The outer layer portion 14a is located on each of the first main surface 12a side and the second main surface 12b side of the multilayer body 12, and is a collection of the plurality of ceramic layers 14 located between the first main surface 12a and the inner electrode layer 116 closest to the first main surface 12a, and the plurality of ceramic layers 14 located between the second main surface 12b and the inner electrode layer 116 closest to the second main surface 12b. Additionally, the region sandwiched between both the outer layer portions 14a is the inner layer portion 14b. Note that a thickness of the outer layer portion 14a is preferably equal to or more than approximately 50 μm and equal to or less than approximately 200 μm, for example.

The dimension of the multilayer body 12 is not particularly limited.

Since the material of the ceramic layer 14 is the same or substantially the same as that of the multilayer ceramic capacitor 10A, description thereof will be omitted.

Furthermore, since the average thickness of the ceramic layer 14 after firing in the lamination direction x is also the same or substantially the same as that of the multilayer ceramic capacitor 10A, description thereof will be omitted.

The multilayer body 12 includes, as the plurality of inner electrode layers 116, a plurality of first inner electrode layers 116a and a plurality of second inner electrode layers 116b. The plurality of first inner electrode layers 116a and the plurality of second inner electrode layers 116b are embedded and alternately provided at equal or substantially equal intervals along the lamination direction x of the multilayer body 12.

As shown in FIG. 19, the first inner electrode layer 116a includes a first opposite electrode portion 118a opposing the second inner electrode layer 116b, one first extended electrode portion 120a1 extended from the first opposite electrode portion 118a to the first end surface 12e of the multilayer body 12, and the other first extended electrode portion 120a2 extended from the first opposite electrode portion 118a to the second end surface 12f of the multilayer body 12. Specifically, the one first extended electrode portion 120a1 is exposed on the first end surface 12e of the multilayer body 12, and the other first extended electrode portion 120a2 is exposed on the second end surface 12f of the multilayer body 12. Accordingly, the first inner electrode layer 116a is not exposed on the first side surface 12c and the second side surface 12d of the multilayer body 12.

As shown in FIG. 22, the second inner electrode layer 116b has a cross or substantially cross shape, and includes a second opposite electrode portion 118b opposing the first inner electrode layer 116a, one second extended electrode portion 120b1 extended from the second opposite electrode portion 118b to the first side surface 12c of the multilayer body 12, and the other second extended electrode portion 120b2 extended from the second opposite electrode portion 118b to the second side surface 12d of the multilayer body 12. Specifically, the one second extended electrode portion 120b1 is exposed on the first side surface 12c of the multilayer body 12, and the other second extended electrode portion 120b2 is exposed on the second side surface 12d of the multilayer body 12. Accordingly, the second inner electrode layer 116b is not exposed on the first end surface 12e and the second end surface 12f of the multilayer body 12.

Note that four corner portions of the second opposite electrode portion 118b of the second inner electrode layer 116b are not subjected to chamfering, but may each have a chamfered shape. Accordingly, overlapping with the corners of the first opposite electrode portion 118a of the first inner electrode layer 116a is able to be significantly reduced or prevented, and thus electric field concentration is able to be significantly reduced or prevented. As a result, insulation breakdown of the ceramic capacitor which may be caused by the electric field concentration is able to be significantly reduced or prevented.

Additionally, the multilayer body 12 includes the side portions (hereinafter, also referred to as "W gaps") 22a of the multilayer body 12 which are located, respectively, between one end of the first opposite electrode portion 118a of the first inner electrode layer 116a in the width direction y and the first side surface 12c and between the other end of the first opposite electrode portion 118a in the width direction y and the second side surface 12d, and the side portions 22a of the multilayer body 12 which are located, respectively, between one end of the second opposite electrode portion 118b of the second inner electrode layer 116b in the width direction y and the first side surface 12c and between the other end of the first opposite electrode portion 118a in the width direction y and the second side surface 12d. Furthermore, the multilayer body 12 includes the end portions (hereinafter, also referred to as "L gaps") 22b of the multilayer body 12 which are located, respectively, between one end of the second inner electrode layer 116b in the length direction z and the first end surface 12e and between the other end of the second inner electrode layer 116b in the length direction z and the second end surface 12f.

Since a material of the inner electrode layer 116 is the same or substantially the same as the material of the inner electrode layer 16, description thereof will be omitted. Furthermore, since a thickness and the number of laminated layers of the inner electrode layer 116 are also the same or substantially the same as those of the inner electrode layer 16, description thereof will be omitted.

A signal terminal electrode 26 is provided on each of the first end surface 12e side and the second end surface 12f side of the multilayer body 12. The signal terminal electrode 26 includes a first signal terminal electrode 26a and a second signal terminal electrode 26b.

The first signal terminal electrode 26a is provided on the first end surface 12e of the multilayer body 12. The first signal terminal electrode 26a extends from the first end surface 12e and covers a portion of each of the first main surface 12a, the second main surface 12b, the first side surface 12c, and the second side surface 12d of the multilayer body 12. Furthermore, the first signal terminal electrode 26a is electrically connected to the one first extended electrode portion 120a1 of the first inner electrode layer 116a exposed on the first end surface 12e of the multilayer body 12.

The second signal terminal electrode 26b is provided on the second end surface 12f of the multilayer body 12. The second signal terminal electrode 26b extends from the second end surface 12f and covers a portion of each of the first main surface 12a, the second main surface 12b, the first side surface 12c, and the second side surface 12d of the multilayer body 12. Furthermore, the second signal terminal electrode 26b is electrically connected to the other first extended electrode portion 120a2 of the first inner electrode layer 116a exposed on the second end surface 12f of the multilayer body 12.

A ground electrode 28 is provided on each of the first side surface 12c side and the second side surface 12d side of the multilayer body 12. The ground terminal electrode 28 includes a first ground terminal electrode 28a and a second ground terminal electrode 28b.

The first ground terminal electrode 28a is provided on the first side surface 12c of the multilayer body 12. The first ground terminal electrode 28a extends from the first side surface 12c and covers a portion of each of the first main surface 12a and the second main surface 12b. The first ground terminal electrode 28a is electrically connected to the one second extended electrode 120b1 of the second inner electrode layer 116b exposed on the first side surface 12c of the multilayer body 12.

The second ground terminal electrode 28b is provided on the second side surface 12d of the multilayer body 12. The second ground terminal electrode 28b extends from the second side surface 12d and covers a portion of each of the first main surface 12a and the second main surface 12b. The second ground terminal electrode 28b is electrically connected to the other second extended electrode 120b2 of the second inner electrode layer 116b exposed on the second side surface 12d of the multilayer body 12.

In the multilayer body 12, the first opposite electrode portion 118a of the first inner electrode layer 116a and the second opposite electrode portion 118b of the second inner electrode layer 116b oppose each other with the ceramic layer 14 located therebetween, thereby defining an electrostatic capacity. Therefore, the electrostatic capacity is able to be provided between the signal terminal electrode 26 to which the first inner electrode layer 116a is connected and the ground terminal electrode 28 to which the second inner electrode layer 116b is connected, and characteristics of a capacitor appears.

The first signal terminal electrode 26a and the second signal terminal electrode 26b each includes, in order from the multilayer body 12 side, a base electrode layer provided on the surface of the multilayer body 12 and a plating layer that covers the base electrode layer.

The first ground terminal electrode 28a and the second ground terminal electrode 28b each includes, in order from the multilayer body 12 side, a base electrode layer provided on the surface of the multilayer body 12 and a plating layer that covers the base electrode layer.

Note that since a material, a structure, and the like of the base electrode layer in the multilayer ceramic capacitor 10B are the same or substantially the same as those of the multilayer ceramic capacitor 10A, description thereof will be omitted.

Furthermore, since a material, a structure, and the like of the plating layer in the multilayer ceramic capacitor 10B are the same or substantially the same as those of the multilayer ceramic capacitor 10A, description thereof will be omitted.

2. Printing Plate for Gravure Printing

Next, printing plates 40B1 and 40B2 for gravure printing according to the second preferred embodiment of the present invention will be described.

When printing an inner electrode pattern of the multilayer ceramic capacitor 10B shown in FIG. 21, as a printing plate for gravure printing, the printing plate 40B1 in which a plurality of printing portions 142a as shown in FIG. 23 are provided is used.

Since the printing portion 142a provided on the printing plate 40B1 is the same or substantially the same as that of the printing portion 42 provided on the printing plate 40A1, description thereof will be omitted.

Note that in the printing plate 40B1, the first projection portions 56 may not be provided or may be provided on both end portions of the first bank 44. Additionally, in the partition bank 52 located at the print starting end portion 50, as in the partition bank 52' shown in FIG. 14, neither one end portion nor the other end portion thereof may be connected to the first bank 44.

Figure 24:
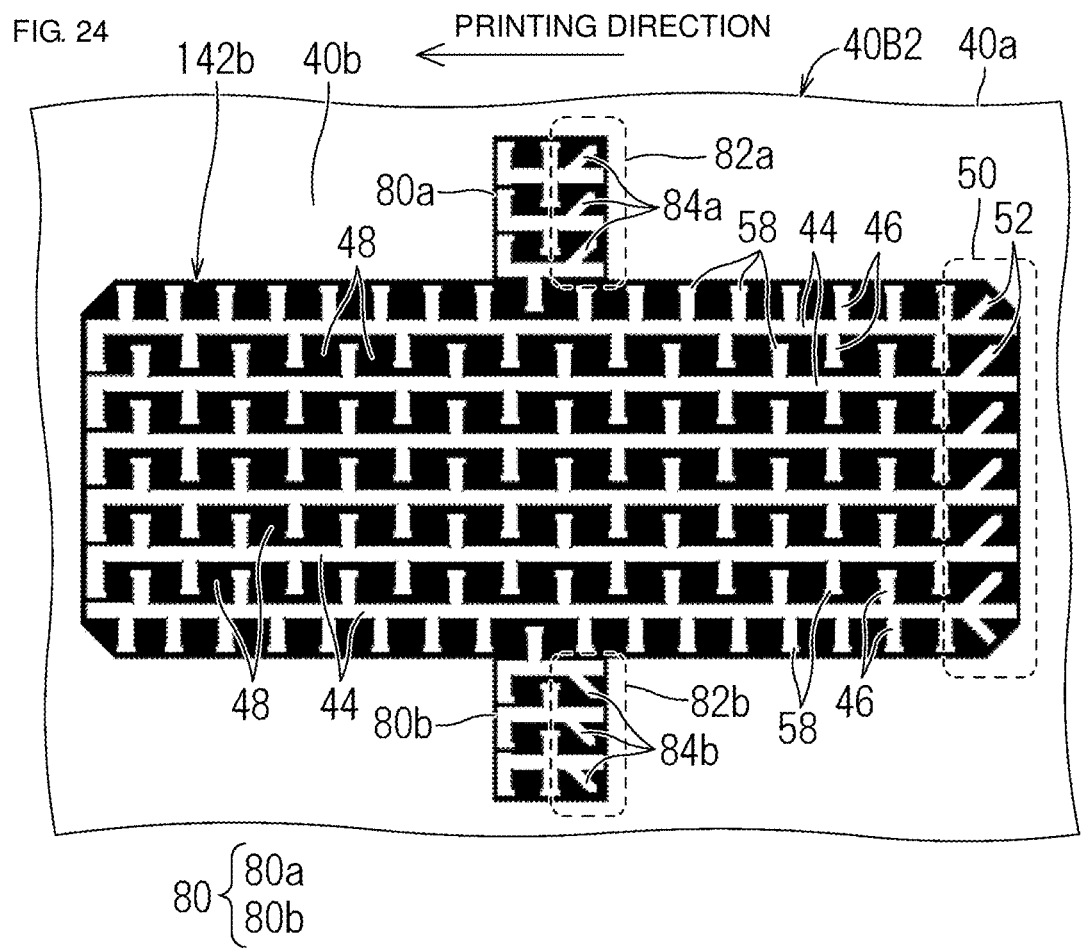
FIG. 24 is a diagram of the printing plate for gravure printing according to the second preferred embodiment of the present invention, and is a plan view showing a printing portion that defines a second inner electrode layer shown in FIG. 22.

Furthermore, when printing an inner electrode pattern of the multilayer ceramic capacitor 10B shown in FIG. 22, as a printing plate for gravure printing, the printing plate 40B2 in which a plurality of printing portions 142b as shown in FIG. 24 is provided is used.

The printing portion 142b is provided with a wide width portion 80 with a wide width in a direction orthogonal or substantially orthogonal to a rotation direction of the printing plate 40B2 (axial center direction). The wide width portion 80 includes a first wide width portion 80a extending along the axial center direction from a portion of one end side extending along a printing direction of the printing portion 142b, and a second wide width portion 80b extending along the axial center direction from a portion of the other end side extending along the printing direction of the printing portion 142b. In the cell 48 located at a print starting end portion 82a which first comes into contact with the printing target portion 60 among the cells 48 located in the first wide width portion 80a, a third partition bank 84a which divides the cell 48 in a diagonal direction is provided. Furthermore, in the cell 48 located at a print starting end portion 82b which first comes into contact with the printing target portion 60 among the cells 48 located in the second wide width portion 80b, a third partition bank 84b which divides the cell 48 in a diagonal direction is provided.

Note that in the printing plate 40B2, the first projection portions 56 may not be provided or may be provided on both end portions of the first bank 44. In addition, neither one end portion nor the other end portion of the partition bank 52 located at the print starting end portion 50 may be connected to the first bank 44 as in the partition bank 52' shown in FIG. 14, and neither one end portion nor the other end portion of each of the partition banks 84a and 84b respectively located at the print starting end portions 82a and 82b may also be connected to the first bank 44 as in the partition bank 52' shown in FIG. 14.

Furthermore, the four corners of the printing portion 142b are subjected to chamfering. By performing printing with the printing portion 142b subjected to chamfering, printing is able to be performed with the inner electrode pattern in which the four corners of the second opposite electrode portion 118b of the second inner electrode layer 116b shown in FIG. 22 are subjected to chamfering. By providing such a shape of the second opposite electrode portion 118b, overlapping with the corners of the first opposite electrode portion 118a of the first inner electrode layer 116a is able to be significantly reduced or prevented, and thus electric field concentration is able to be significantly reduced or prevented. As a result, insulation breakdown of the ceramic capacitor which may be caused by the electric field concentration is able to be significantly reduced or prevented. Note that the four corners of the printing portion 142b may not be subjected to chamfering.

According to the printing plate 40B2 shown in FIG. 24, even when an inner electrode pattern provided with the wide width portion 80 is printed, by arranging the third partition bank 84a which divides the cell 48 in the diagonal direction at the print starting end portion 82a of the first wide width portion 80a, and by arranging the third partition bank 84b which divides the cell 48 in the diagonal direction in the cell 48 located at the print starting end portion 82b of the second wide width portion 80b, which first comes into contact with the printing target portion 60 again by providing the wide width portion 80, while providing the opening area, the ceramic green sheet of the partition bank which is the transfer trigger is able to be kept constant or substantially constant, and thus the print blur is able to be significantly reduced or prevented.

Note that the printing portion 142a and the printing portion 142b may be provided on the same printing plate.

As described above, although the preferred embodiments of the present invention have been disclosed in the above description, the present invention is not limited thereto.

That is, various changes may be applied to the mechanism, the shape, the material, the quantity, the position, the arrangement, and the like of the preferred embodiments described above without departing from the scope of the technical idea and the object of the present invention, and these are included in the present invention.

While preferred embodiments of the invention have been described above, it is to be understood that variations and modifications will be apparent to those skilled in the art without departing from the scope and spirit of the invention. The scope of the invention, therefore, is to be determined solely by the following claims.

What is claimed is:

1. A printing plate for gravure printing in which a printing paste is applied on a printing object to provide a predetermined graphic pattern by a gravure printing method, the printing plate for gravure printing comprising:
   a gravure roll with a cylindrical or substantially cylindrical shape; wherein
   a plurality of printing portions corresponding to a graphic pattern to be printed are provided on an outer circumferential surface of the gravure roll;
   each of the plurality of printing portions includes a plurality of first banks each extending in a parallel or substantially parallel direction to a rotation direction of the gravure roll, a plurality of second banks each extending in a direction orthogonal or substantially orthogonal to the rotation direction and in each of which at least one end portion is connected to the plurality of first banks, and a plurality of cells defined by the plurality of first banks and the plurality of second banks; and
   in a cell of the plurality of cells located at a print starting end portion of each of the plurality of printing portions which first comes into contact with the printing object in the rotation direction, a partition bank which partitions the cell in a diagonal direction of the cell is provided.

2. The printing plate for gravure printing according to claim 1, wherein a width of each end portion of each of the plurality of first banks, in which the each end portion is located in a printing direction and the width is defined along the direction orthogonal or substantially orthogonal to the printing direction, is larger than a width of a portion other than the each end portion of each of the plurality of first banks, in which the width is defined along the direction orthogonal or substantially orthogonal to the printing direction.

3. The printing plate for gravure printing according to claim 1, wherein first end portions of the plurality of second banks are connected to the plurality of first banks in a staggered arrangement.

4. The printing plate for gravure printing according to claim 1, wherein a width of a second end portion of each of the plurality of second banks, in which the second end portion is not connected to any of the plurality of first banks and the width is defined along the parallel or substantially parallel direction to the printing direction, is larger than a width of a portion other than the second end portion of each of the plurality of second banks, in which the width is defined along the parallel or substantially parallel direction to the printing direction.

5. The printing plate for gravure printing according to claim 1, wherein one end portion of the partition bank is connected to the plurality of first banks.

6. The printing plate for gravure printing according to claim 1, wherein an angle defined by intersecting a center line of the partition bank along an extending direction of the partition bank and a center line of each of the plurality of first banks along an extending direction of each of the plurality of first banks with each other is about 15° or greater and about 75° or less.

7. The printing plate for gravure printing according to claim 1, wherein the partition bank is not connected to any of the plurality of first banks.

8. The printing plate for gravure printing according to claim 1, wherein
   each of the plurality of printing portions is provided with a narrow width portion in which a width of each of the plurality of printing portions is narrow in the direction orthogonal or substantially orthogonal to the rotation direction; and
   a second partition bank which partitions the cell to obliquely intersect with respect to the printing direction is provided in the cell located on an outline of the narrow width portion.

9. The printing plate for gravure printing according to claim 1, wherein
   each of the plurality of printing portions is provided with a wide width portion in which the width of each of the plurality of printing portions is wide in the direction orthogonal or substantially orthogonal to the rotation direction; and
   a third partition bank which partitions the cell in a diagonal direction of the cell is provided in the cell located at a print starting end portion of each of the plurality of printing portions which first comes into contact with the printing object among the cells located in the wide width portion.

10. The printing plate for gravure printing according to claim 1, wherein the plurality of printing portions are provided in a matrix or substantially matrix shape along the rotation direction and an axial center direction of the printing plate.

11. The printing plate for gravure printing according to claim 1, wherein each of the plurality of printing portions has a rectangular or substantially rectangular shape or a substantially rectangular shape in which a narrow width portion or a wide width portion is partially provided.

12. The printing plate for gravure printing according to claim 1, wherein
   each of the plurality of printing portions includes a plurality of gap portions provided between a portion of the plurality of first banks and a portion of the plurality of second banks; and
   the gap portions connect adjacent cells to one another.

13. A method of manufacturing a multilayer ceramic electronic component, the multilayer ceramic electronic component including a multilayer body including a plurality of laminated ceramic layers and a plurality of laminated inner electrode layers and outer electrodes provided at a first end portion of the multilayer body and a second end portion of the multilayer body, the method of manufacturing the multilayer ceramic electronic component comprising:
   printing an inner electrode pattern on a ceramic green sheet using the printing plate for gravure printing according to claim 1.

14. The method of manufacturing a multilayer ceramic electronic component according to claim 13, wherein a conductive paste is supplied to the printing plate by injecting the conductive paste toward the printing plate.

* * * * *